United States Patent [19]
Takei et al.

[11] Patent Number: 5,970,202
[45] Date of Patent: Oct. 19, 1999

[54] COMMUNICATION APPARATUS

[75] Inventors: Masahiro Takei, Kawasaki; Tadashi Takayama; Susumu Doi, both of Yokohama, all of Japan

[73] Assignee: Canon Kabushiki Kaisha, Tokyo, Japan

[21] Appl. No.: 08/351,109

[22] Filed: Nov. 30, 1994

Related U.S. Application Data

[63] Continuation of application No. 07/989,893, Dec. 10, 1992, abandoned, which is a continuation of application No. 07/257,269, Oct. 13, 1988, abandoned.

[30] Foreign Application Priority Data

| | | | |
|---|---|---|---|
| Oct. 16, 1987 | [JP] | Japan | 62-261007 |
| Oct. 16, 1987 | [JP] | Japan | 62-261009 |
| Oct. 16, 1987 | [JP] | Japan | 62-261010 |
| Oct. 16, 1987 | [JP] | Japan | 62-261012 |
| Oct. 16, 1987 | [JP] | Japan | 62-261013 |

[51] Int. Cl.$^6$ .................................................... H04N 5/76
[52] U.S. Cl. ............................................... 386/46; 386/95
[58] Field of Search ...................... 358/335, 342, 358/340, 336, 403, 404, 405, 407; 348/705; 386/46, 125, 95, 1, 31, 77, 52

[56] References Cited

U.S. PATENT DOCUMENTS

| | | | |
|---|---|---|---|
| 3,811,090 | 5/1974 | Uchida et al. | 358/190 |
| 4,485,400 | 11/1984 | Lemelson et al. | 360/33.1 |
| 4,717,968 | 1/1988 | Painton et al. | 360/35.1 |
| 4,740,828 | 4/1988 | Kinoshita | 358/906 |
| 4,772,962 | 9/1988 | Tanaka et al. | 360/10.1 |
| 4,816,929 | 3/1989 | Bradley et al. | 360/10.1 |
| 4,819,093 | 4/1989 | Okada et al. | 358/909 |
| 4,858,031 | 8/1989 | Fukuta | 358/906 |
| 4,858,032 | 8/1989 | Okada et al. | 358/335 |

FOREIGN PATENT DOCUMENTS

| | | |
|---|---|---|
| 62-155540 | 7/1987 | Japan . |
| 63-40487 | 2/1988 | Japan . |

*Primary Examiner*—Huy T. Nguyen
*Attorney, Agent, or Firm*—Fitzpatrick Cella Harper & Scinto

[57] ABSTRACT

A communication apparatus is provided with an element for reading out information signals recorded on a medium. The reading element includes a reproducing portion for reproducing the signals recorded on the medium and a processing portion to process the reproduced signals. The information signals are temporarily stored and sequentially transmitted. Electric power to the reading means is controlled when the information is transmitted through a communication line.

14 Claims, 18 Drawing Sheets

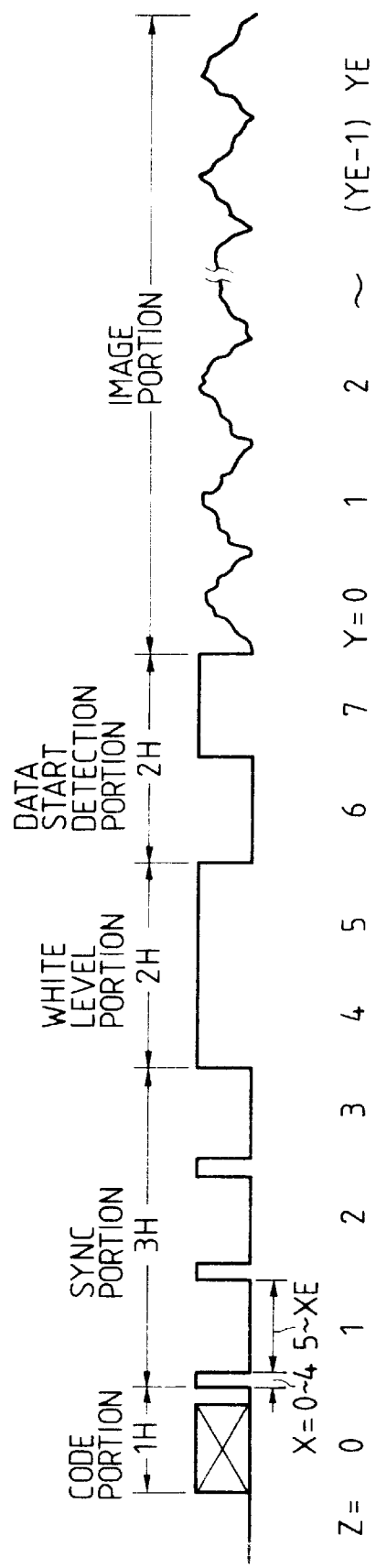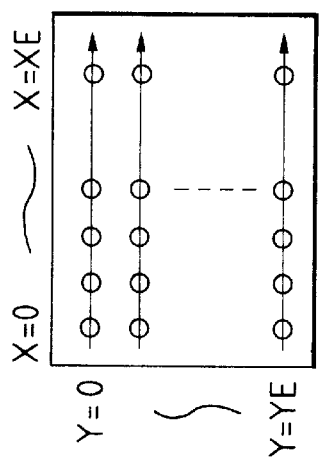

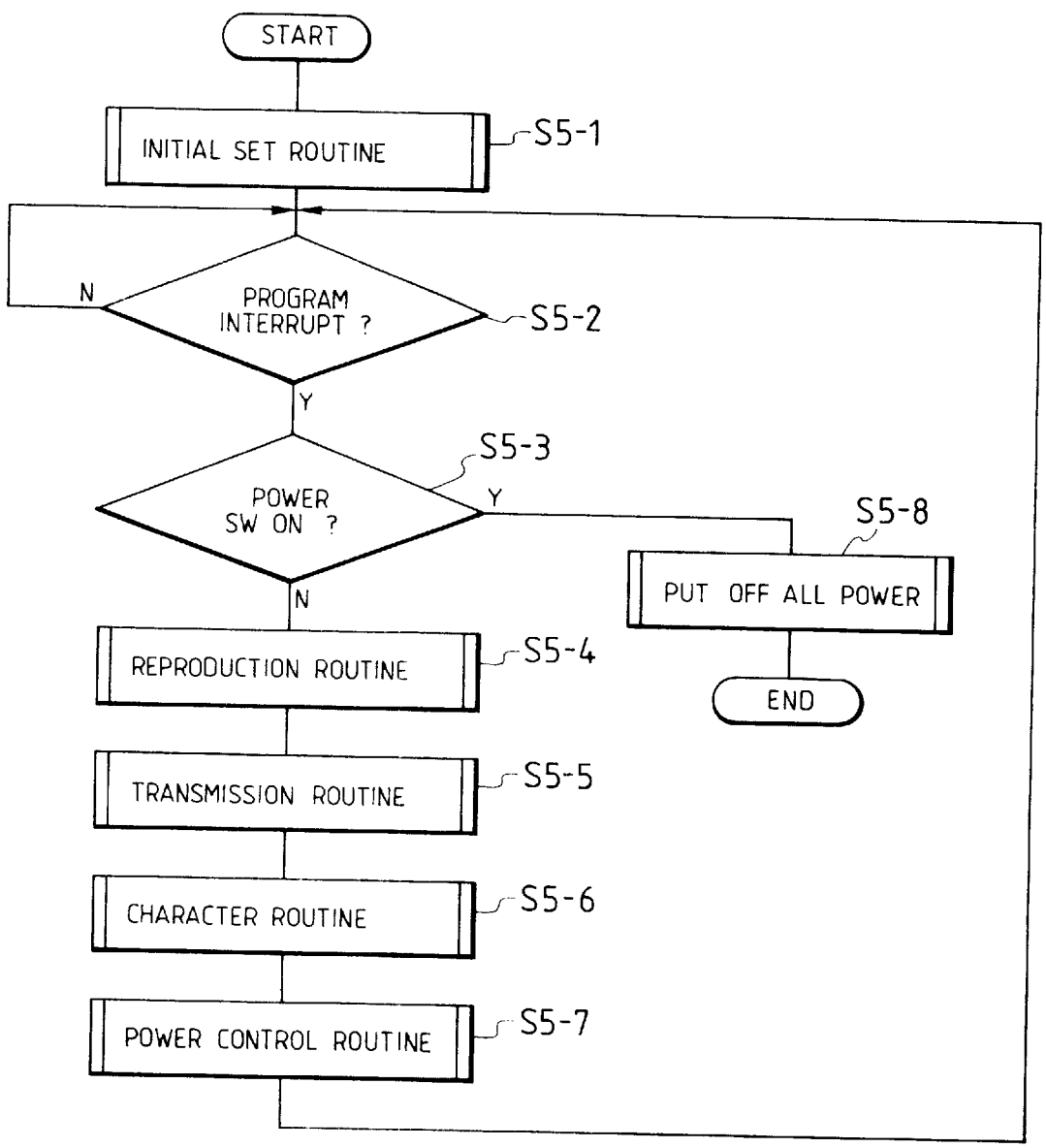

DISP STS=0

DISP STS=1

DISP STS=2

COMMUNICATION APPARATUS

This application is a continuation of application Ser. No. 07/989,893 filed Dec. 10, 1992, abandoned, which is a continuation of application Ser. No. 07/257,269 filed Oct. 13, 1988 abandoned.

BACKGROUND OF THE INVENTION

1. Field of the Invention

The present invention relates to a communication apparatus.

2. Related Background Art

Hitherto, for example, as a communication apparatus in which an image signal recorded on a recording medium is read out and transmitted through a transmission path such as a telephone line, there has been proposed an apparatus disclosed in, e.g., Japanese Patent Application No. 61-116974 by the applicant of the present invention.

However, for instance, in the case of considering a portable apparatus as the foregoing communication apparatus, it is inevitable to realize a low electric power consumption due to a limitation of a power supply.

With respect to this point, the foregoing apparatus still has points to be improved.

SUMMARY OF THE INVENTION

It is an object of the present invention to provide a communication apparatus in which electric power consumption is reduced in consideration of the foregoing problems.

Another object of the invention is to provide a communication apparatus which can be easily used.

Under such objects, according to a preferred embodiment of the present invention, there is disclosed a communication apparatus comprising: means for reading out a signal recorded in a medium; transmitting means for once storing the signal read out by the reading means and for sequentially transmitting through a transmission path; and means for supplying electric power to the reading means and for controlling the supply of the electric power to at least a part of the reading means when the transmitting means executes the transmitting operation, wherein when the transmitting means executes the transmitting operation, the supply of the electric power to at least a part of the reading means is controlled by the means for supplying the electric power.

Still another object of the invention is to provide a monitor apparatus which can be easily used.

Further another object of the invention is to provide a monitor apparatus having a high power saving effect.

Further another object of the invention is to provide a communication apparatus which can easily check a communicating state.

The above and other objects and features of the present invention will become apparent from the following detailed description and the appended claims with reference to the accompanying drawings.

BRIEF DESCRIPTION OF THE DRAWINGS

FIGS. 3 and 4 are diagrams for explaining a transmission format of the embodiment;

FIGS. 5 to 14 and 16 are flowcharts for explaining the operation of the embodiment;

DESCRIPTION OF THE PREFERRED EMBODIMENT

An embodiment of the invention will be described hereinbelow with reference to the drawings. This embodiment discloses an apparatus in which color or monochrome images recorded on respective tracks on a magnetic disk (hereinafter, also referred to as a video floppy) are reproduced and once stored into a semiconductor memory, these images can be checked by a monitor assembled in the apparatus, and the image signals are sequentially read out of the memory and transmitted through a transmission path such as a telephone line. However, the invention is not obviously limited to such an apparatus.

(Arrangement of the apparatus of the embodiment)

Figure 1:
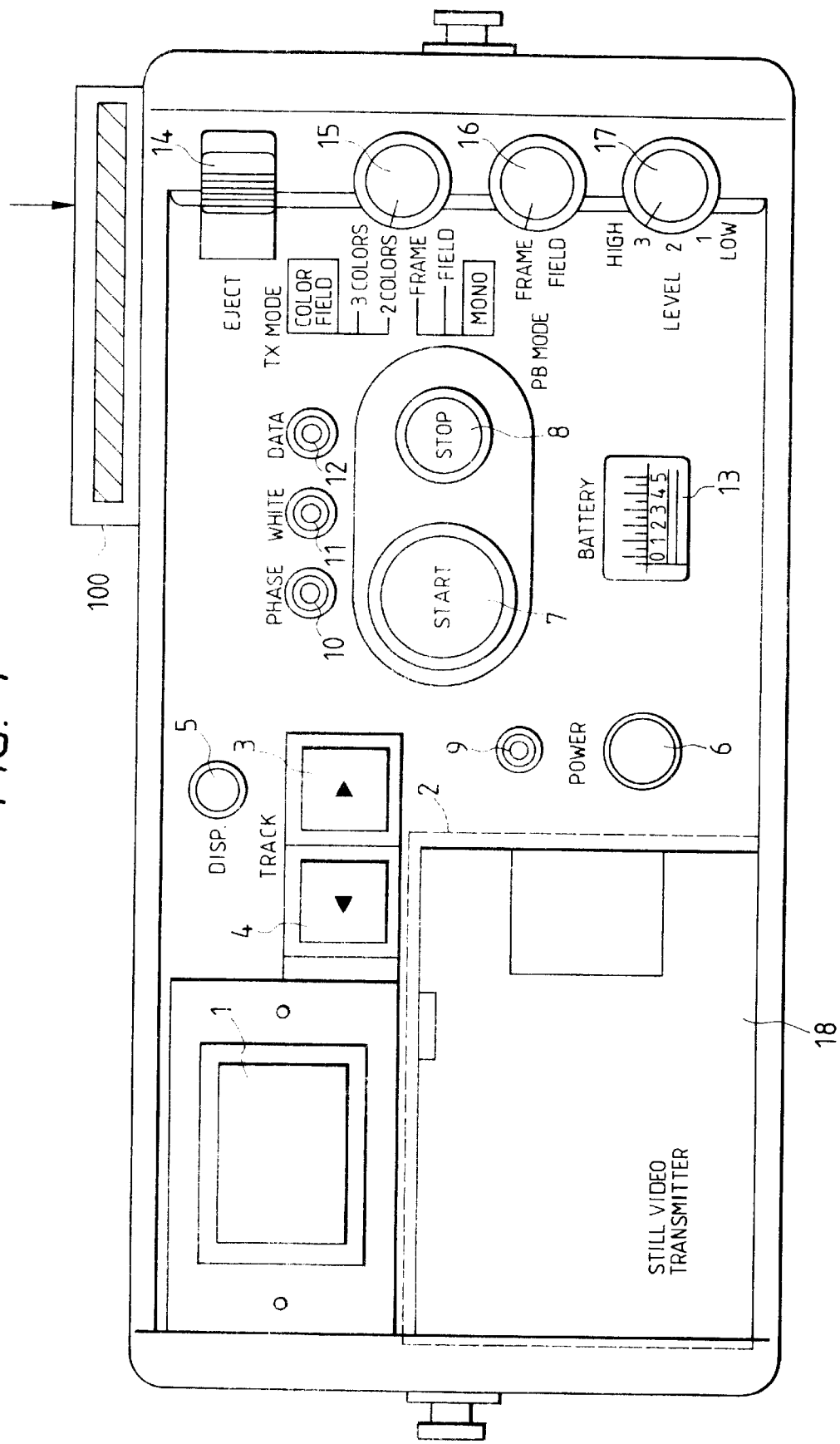
FIG. 1 is a diagram showing a front panel of an embodiment.

FIG. 1 shows a front panel of a still image transmitting apparatus to which the invention is applied.

In FIG. 1, a monitor 1 reproduces a reproduction image signal, as a visible image, reproduced from a video floppy and is used for selection by checking the image before transmission.

Reference numeral 18 denotes an enclosing portion to enclose an acoustic coupler as means for transmitting. Reference numeral 2 denotes a shielding plate. When the acoustic coupler is enclosed in the enclosing portion 18, monitor, is prevented by the shielding plate 2 from being is adversely influenced by the magnetic field due to a magnetic material of a speaker or the like included in the acoustic coupler. Since the shielding plate 2 is arranged in the main body of the apparatus, it is shown by a broken line.

Reference numeral 3 denotes a switch to move the reproduction track in such a direction that the track number increases when the video floppy is reproduced; 4 is a switch to move the reproduction track in such a direction as to decrease the track number; 5 a display switch to allow the reproduction track No., transmission track No., or the like to be displayed on the monitor 1, as will be explained hereinafter; 6 a power switch to put on or off a power supply of the apparatus each time it is pressed; and 9 a power LED which is lit on while the power supply is ON.

Reference numeral 7 denotes a transmission start switch; 8 is a transmission stop switch to stop the transmission during the transmission; and 10, 11, and 12 LEDs (light emitting diodes) which are lit on in accordance with the progress of the transmission sequence, which will be explained hereinlater.

Reference numeral 13 denotes a battery meter to monitor a power supply voltage of the transmitter and 14 indicates an eject switch to take out a video floppy jacket.

Reference numeral 15 denotes a switch to determine the transmission mode. This switch can select either the color field mode or the monochrome mode. The color field mode includes the 3-color (R, G, B) mode and the 2-color (compression data of Y and (R-Y)/(B-Y)). The monochrome mode includes the frame mode and the field mode. Either the frame reproduction mode or the field reproduction mode can be selected by a reproduction mode switch 16.

A level selection switch 17 is used to adjust an output of a speaker when the transmission is performed by the acoustic coupler. Reference numeral 18 denotes the enclosing room mentioned above. An inserting portion 100 is provided to insert a video floppy. FIG. 1 shows a state in which the inserting portion 100 is open when a video floppy is inserted. After the user inserts a video floppy, he closes the door in the direction indicated by an arrow and the loading process of the video floppy is completed.

Figure 2:
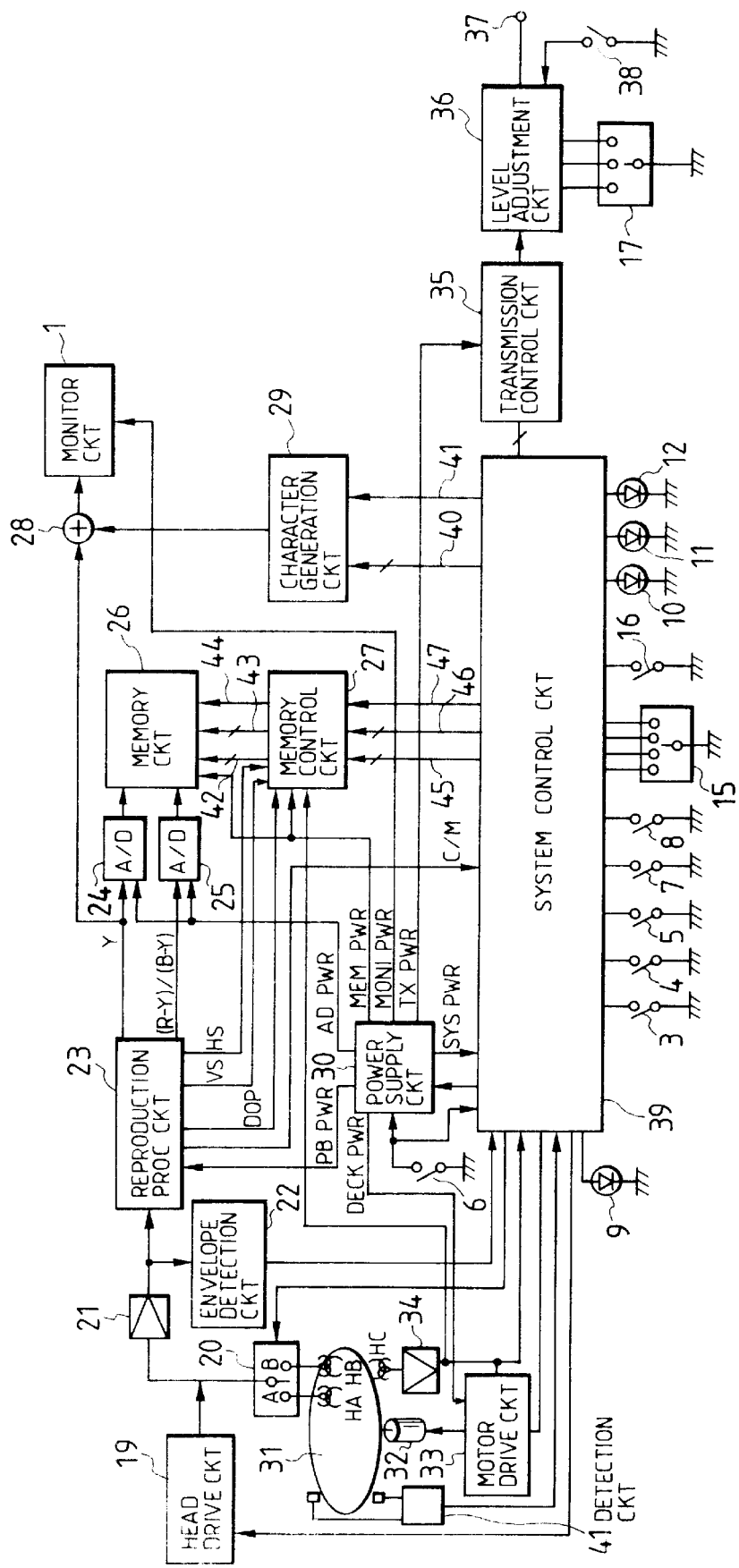
FIG. 2 is a diagram showing a whole system arrangement of the embodiment.

FIG. 2 is a block diagram for explaining a system arrangement of an electrical system of the apparatus in the embodiment.

In FIG. 2, reference numeral 31 denotes a magnetic sheet enclosed in the video floppy. The image signal of a field unit is recorded on the magnetic sheet 31 so as to form coaxial tracks. The magnetic sheet 31 is rotated by a motor 32 which is controlled by a motor drive circuit 33. The motor drive circuit 33 is also controlled by a system control circuit 39. HA and HB denote reproduction heads which construct, for instance, inline heads and perform the field reproduction or frame reproduction. The head HA is connected to an A terminal of a switch 20. The head HB is connected to a B terminal of the switch 20. The switch 20 is switched by a switching signal from the system control circuit 39. An output of the switch 20 is supplied to a reproduction processing circuit 23 through a reproduction amplifier 21. The reproduction processing circuit 23 produces a reproduction luminance signal (Y), a line sequential color difference signal ((R-Y)/(B-Y)), a horizontal sync signal (HS), a vertical sync signal (VS), a dropout pulse (DOP) which is caused due to the lack of reproduction envelope, and a signal (C/M) indicating whether the reproduction image signal is a color signal or a monochrome signal.

On the other hand, an output of the reproduction amplifier 21 is also supplied to an envelope detection circuit 22. The envelope detection circuit 22 always detects the reproduction envelope. When the reproduction envelope exists, the envelope detection circuit 22 outputs, for instance, an "H" level signal. On the contrary, if no reproduction envelope exists, that is, in the case of the unrecorded track, the envelope detection circuit 22 outputs, e.g., an "L" level signal. An output signal of the envelope detection circuit 22 is supplied to the system control circuit 39.

Both of the reproduction luminance signal Y and the line sequential color difference signal (R-Y)/(B-Y) from the reproduction processing circuit 23 are respectively once stored into a memory circuit 26 through A/D converters 24 and 25. On the other hand, the reproduction luminance signal Y is also supplied to the monitor circuit 1 through an adder 28 in order to monitor a video image. To superimpose the indication of the track number or the like to the video image on the monitor circuit 1, a font pattern signal is also supplied from a character generation circuit 29 to the adder 28. In the character generation circuit 29, data is rewritten for the designated character through a data line 40 and a rewrite control line 41 under the control of the system control circuit 39. The memory circuit 26 has two field memories $M_0$ and $M_1$ as shown in Table 1, which will be explained hereinlater.

The horizontal sync signal HS, vertical sync signal VS, and dropout pulse DOP are supplied from the reproduction processing circuit 23 to a memory control circuit 27 to control the memory circuit 26. Reference numeral 42 denotes an address bus, 43 is a data bus, and 44 a control line. A magnetic member (not shown) to detect a rotational phase is fixed to the magnetic sheet 31 and is detected by a magnetic head HC. An amplifier 34 amplifies an output signal (PG pulse) of the magnetic head HC. An output of the amplifier 34 is returned to the motor drive circuit 33 and used to control the rotational phase of the magnetic sheet 31. This output is also supplied to the memory control circuit 27 and used to control the memory circuit 26.

Further, the PG pulse is also supplied to the system control circuit 39 and is used to progress the system program and for the timer counting.

The memory control circuit 27 is also connected to the system control circuit 39 through a control line 47, a data bus 46, and an address bus 45. The reproduction image signal written from the reproduction processing circuit 23 into the memory circuit 26 is input to the system control circuit 39 through the data bus 43, memory control circuit 27, and data bus 46. The system control circuit 39 sends the image data to a transmission control circuit 35. The transmission control circuit 35 converts the input image data into the signal format (AM, FM, or the like) suitable for the transmission and transmits from an output terminal 37 to the transmission path through a level adjustment circuit 36.

An output of the level setting switch 17 is input to the level adjustment circuit 36 and an output level is changed in accordance with this set level. An output of a switch 38 is also input to the level adjustment circuit 36. The switch 38 is turned on or off in dependence on, for instance, whether the output terminal 37 is directly connected to the telephone line or the acoustic coupler. In the former case, i.e., when the output terminal 37 is connected to the telephone line, a signal at a constant level is always output irrespective of the output of the level setting switch 17 which has already been described.

Various kinds of switches to designate the operation of the apparatus are connected to the system control circuit 39. The track up switch 3 indicates to move the reproduction heads HA and HB in such a direction as to increase the track number. On the contrary, the track down switch 4 indicates to move the heads HA and HB in the decreasing direction. The display switch 5 is used to sequentially change a character which is superimposed to the monitor circuit 1 every time the character is pressed. The operation sequence and the display character format will be described hereinlater. Reference numeral 7 denotes a start switch of the transmitting operation to transmit the reproduction image signal written in the memory circuit 26 from the output terminal 37. The switch 8 is used to stop the transmitting operation during the transmission. The switch 15 is used to designate the transmission mode. By selecting either one of the four positions shown in FIG. 1, the transmission mode is recognized by the system control circuit 39.

The switch 16 is used to select the reproduction mode (field reproduction or frame reproduction). In accordance with the selected reproduction mode, the system control circuit 39 continuously connects the switch 20 to either the A terminal or the B terminal or alternately switches them every field.

The LEDS 10 to 12 also shown in FIG. 1 are lit on during the transmission. As will be explained hereinlater, the LED 10 is lit on in the phase mode, the LED 11 is lit on in the white mode, and the LED 12 is lit on in the data mode (image signal portion).

Under the control of the system control circuit 39, a power supply circuit 30 supplies DECK PWR to the video floppy reproduction portion, PB, PWR to the reproduction processing circuit portion, AD PWR to the A/D converter portion, MEM PWR to the memory circuit portion, MONI PWR to the monitor circuit portion, TX PWR to the transmission control circuit portion, and SYS PWR to the system control circuit portion, respectively, and also puts on or off the power supply.

Figure 22:
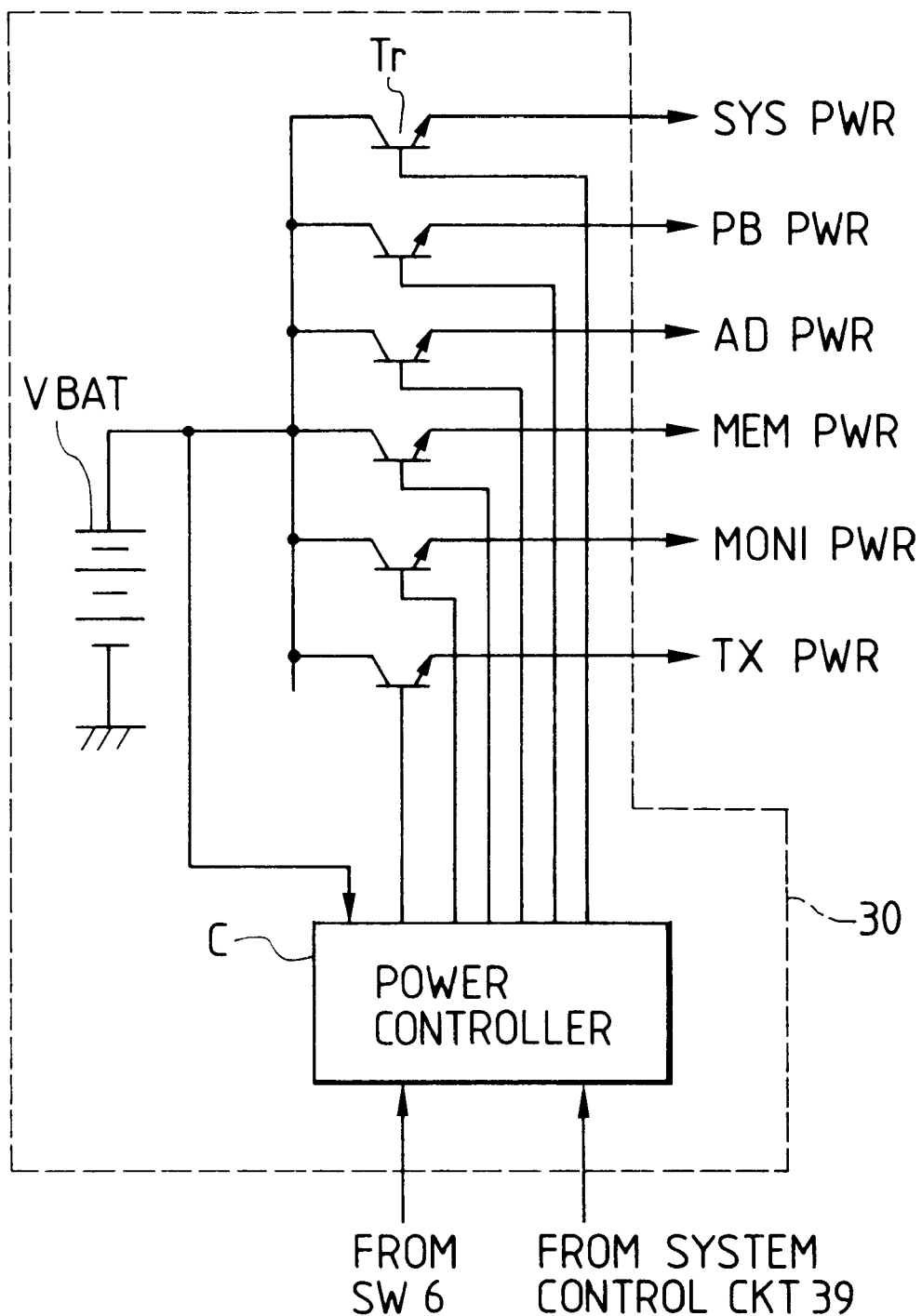
FIG. 22 is a block diagram showing an arrangement of a power supply circuit 30 shown in FIG. 1.

As shown in FIG. 22, the power supply circuit 30 includes a power battery VBAT, a transistor Tr to control this battery, and a power controller C to control this transistor. An output of the power switch 6 is supplied to the power supply circuit 30. When the power switch 6 is pressed in the power OFF state, the operation of the controller C in the power supply circuit 30 is started. Next, the control transistor Tr is controlled to put on the SYS PWR, thereby starting the operation of the system control circuit 39.

The output of the power switch 6 is also supplied to the system control circuit 39. After the system once started the operation, the system control circuit 39 detects the input level and puts on or off the power supply of the apparatus as will be explained hereinlater. While a power source is supplied to at least a part of the apparatus (however, the controller C shown in FIG. 22 is excluded), the power LED 9 is lit on by the system control circuit 39. Reference numeral 41 denotes a detection circuit consisting of a photocoupler to discriminate whether a video floppy has been inserted or not. The transmission control circuit 35 makes a code signal, sync signals, white level, and the like shown in FIG. 3 in accordance with an instruction from the system control circuit and also, for instance, amplitude or frequency modulates the image signal.

FIG. 3 shows a transmission data waveform of a still image in the embodiment. In such a transmission, this diagram shows a transmission waveform regarding a single color when data was read out and transmitted in accordance with a sequence, which will be explained hereinafter, by using the memory circuit 26 shown in FIG. 2. In FIG. 3, an axis of abscissa denotes a time base and an axis of ordinate indicates a level of the transmission data. X and Y shown in the axis of abscissa represent horizontal and vertical addresses in the memory corresponding to the data transmitted. This data waveform comprises: a code portion consisting of transmission data of 1H (1H denotes a time which is required to transmit one horizontal line of the screen); a sync portion consisting of 3H; a white level portion consisting of 2H; a data start detection portion consisting of 2H; and an image portion.

The transmission data in the data portion comprises: data indicating whether the transmission mode is the frame transmission mode or the field transmission mode; and data to distinguish the transmission color mode (monochrome or single color, 2 colors, 3 colors, 4 colors).

The sync portion is repeated at the period of 1H (when the sync portion is generated by reading 0 to XE dots of one line by 1H, the 0th to 4th dots are set to the white level and the 5th to XEth dots are set to the black level) and corresponds to the sync signals to know a delimiter of the line in the image signal portion. The white level portion corresponds to the white level in the image portion and relates to a reference level signal to correct a transmission level change which is influenced by the state of the transmission line. In such a data waveform, an interval of each of the sync portion and white level portion can be set to a long time, for example, ten seconds.

On the other hand, the data start detecting portion of 2H is provided to more accurately obtain the start of the data of the image signal.

FIG. 4 is a diagram showing a two-dimensional array of the data in the image portion. The horizontal direction consists of X=0 to XE dots and the vertical direction consists of Y=0 to YE lines and this array consists of total (XE+1) dots×(YE+1) dots.

(Operation of the embodiment)

The operation of the embodiment of the invention will now be described with reference to flowcharts.

FIG. 5 is a flowchart for explaining the whole apparatus of the embodiment. In this diagram, "START" begins when the power source SYS PWR is supplied from the power supply circuit 30 to the system control circuit 39 by pressing the power switch 6 in the power OFF state of the system.

First, the necessary parameters are initialized in the initial setting routine of the system in step 5-1. Practically speaking, a flag TX FLG indicating that the transmission is being executed is cleared. After the video floppy was inserted into the inserting portion 100, a flag INI FLG indicating whether or not it is necessary to perform the reproduction initializing operation to recognize which track the system control circuit 39 is at present reproducing is set and the interrupting process is executed to perform the transmitting operation. A flag IRQ FLG to determine whether this interrupting process is started or not is set and the interrupting process is inhibited. On the other hand, a timer OFF TIM to automatically put off the power supply when none of the up/down operation of the track and the transmitting operation is performed for a predetermined period of time (e.g., ten minutes) while the power supply is put on is preset. Further, a parameter DISP STS to decide the state of the track information to be superimposed on the monitor is reset.

In addition, the foregoing power sources PB, PWR, DECK PWR, MONI PWR, MEM PWR, and TX PWR are all set off state by controlling the power supply circuit. The power LED is also lit on and all of the LEDs 10 to 12 to display the transmission sequence are lit off.

After completion of the initialization, a check is made to see if a program interruption request to start the program has been generated or not (step 5-2). The program interruption is started by, for example, an internal counter of 20 msec provided in the system control circuit 39 or by the PG signal associated with the video floppy reproduction and any one of them is used to make the timer operative as mentioned above. The former method is selected if no video floppy is set. The latter method is selected if a video floppy has been set.

If the program interrupting process has been started, a check is made to see if the power switch 6 has been pressed or not. If it has been pressed, the power supply circuit 30 is controlled and all of the power sources which are supplied to the respective circuit portions are turned off. Thereafter, the power source SYS PWR is also put off and the power supply of the system is put off.

Figure 6A:
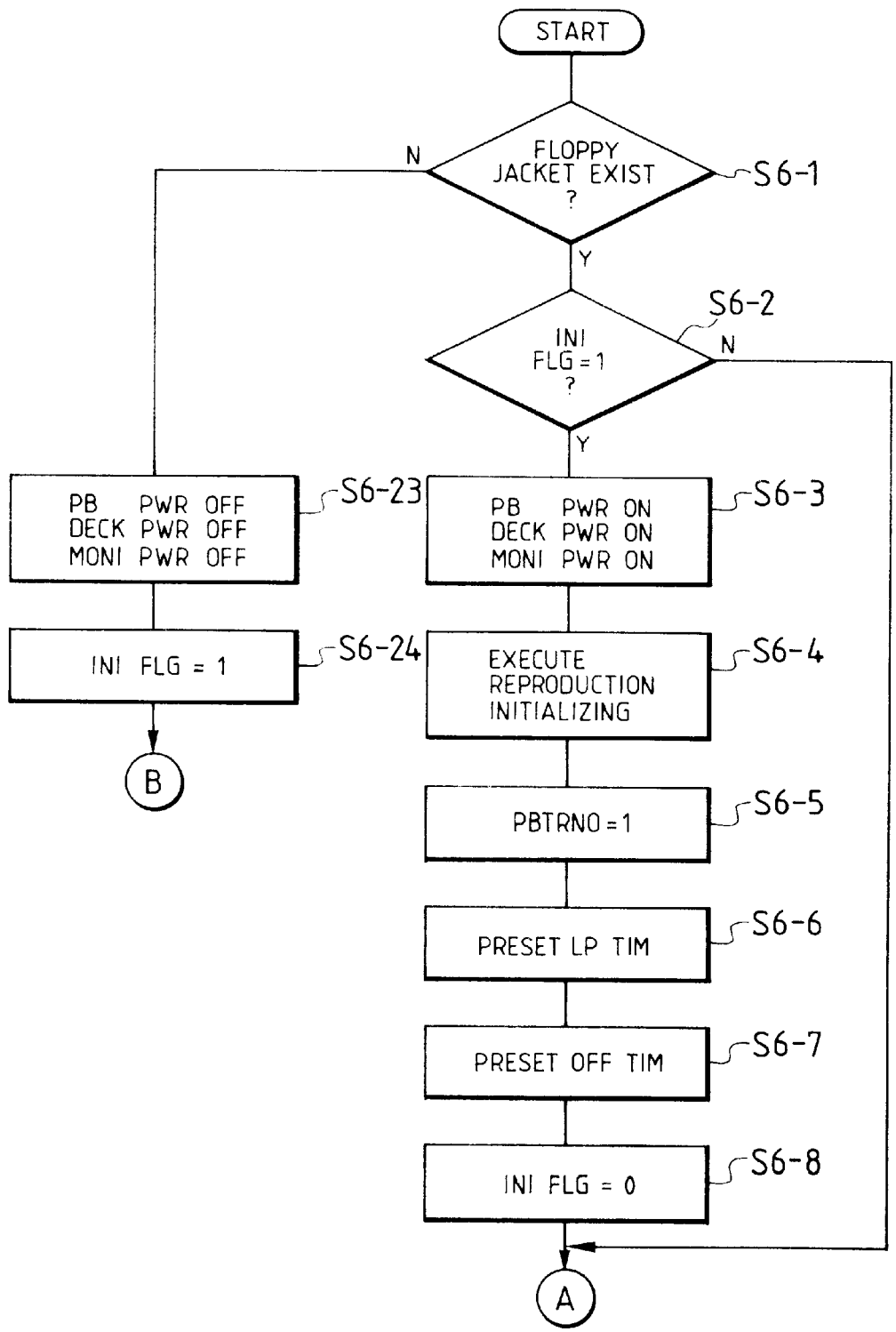
Figure 6B:
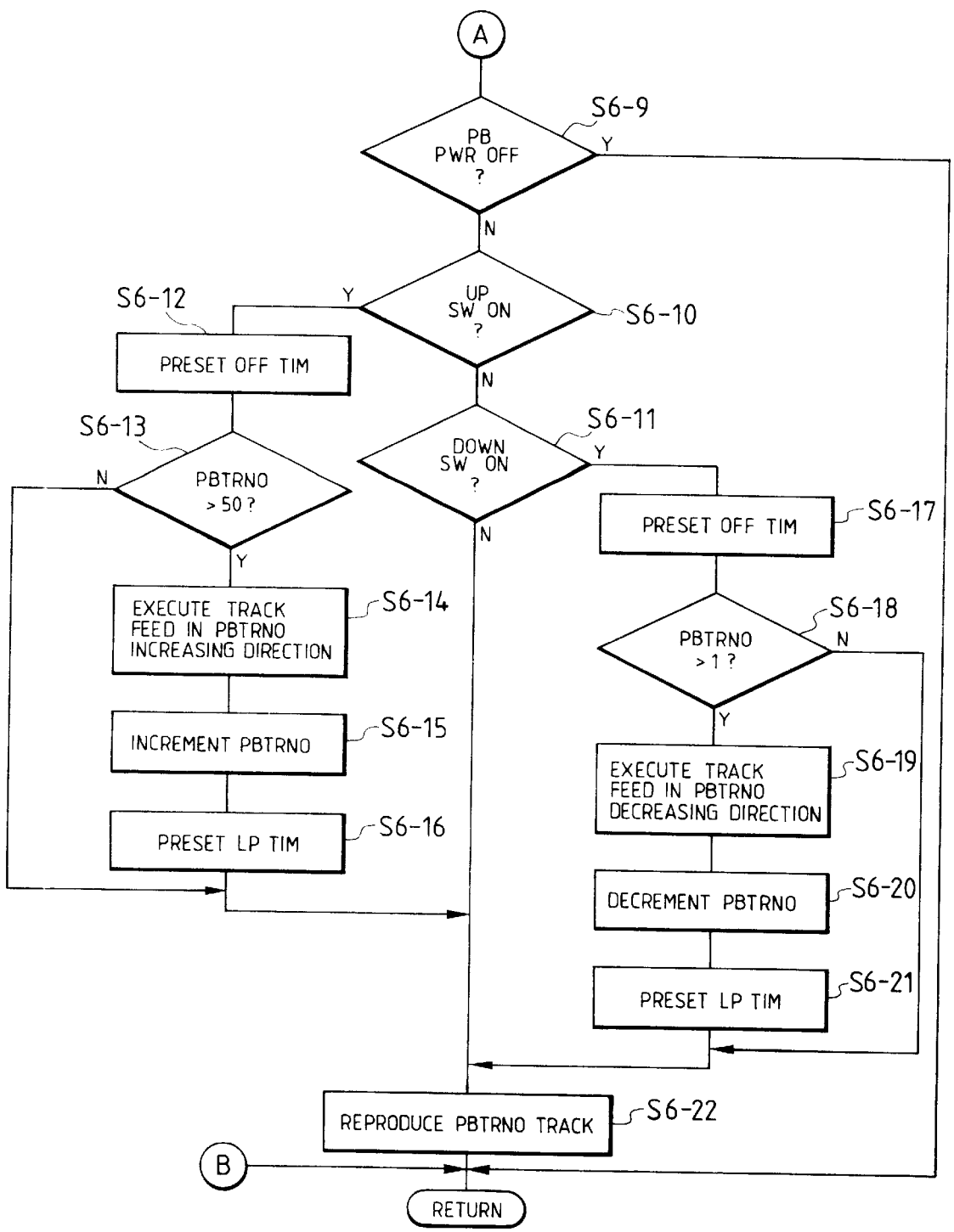
Figure 7:
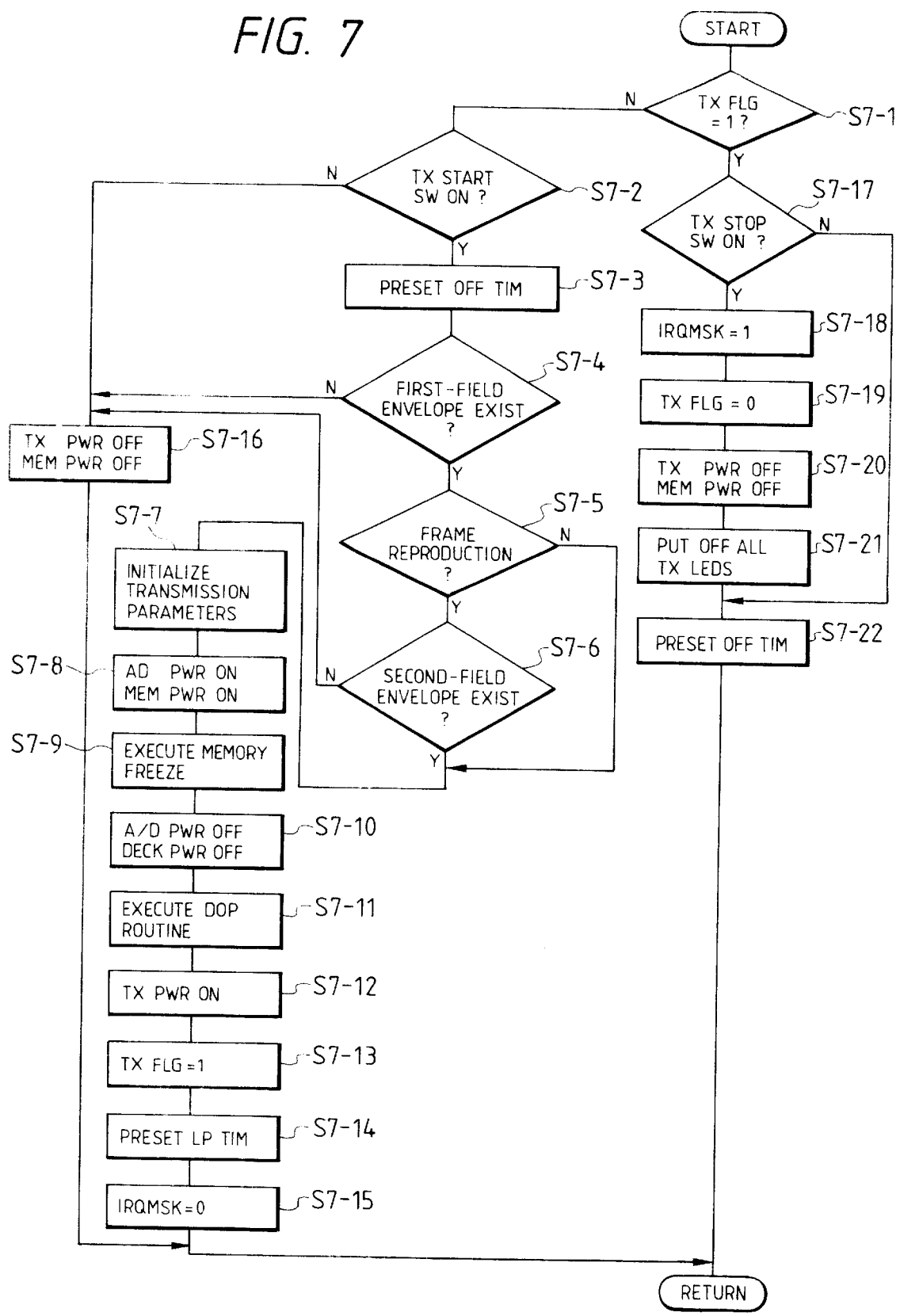
Figure 14:
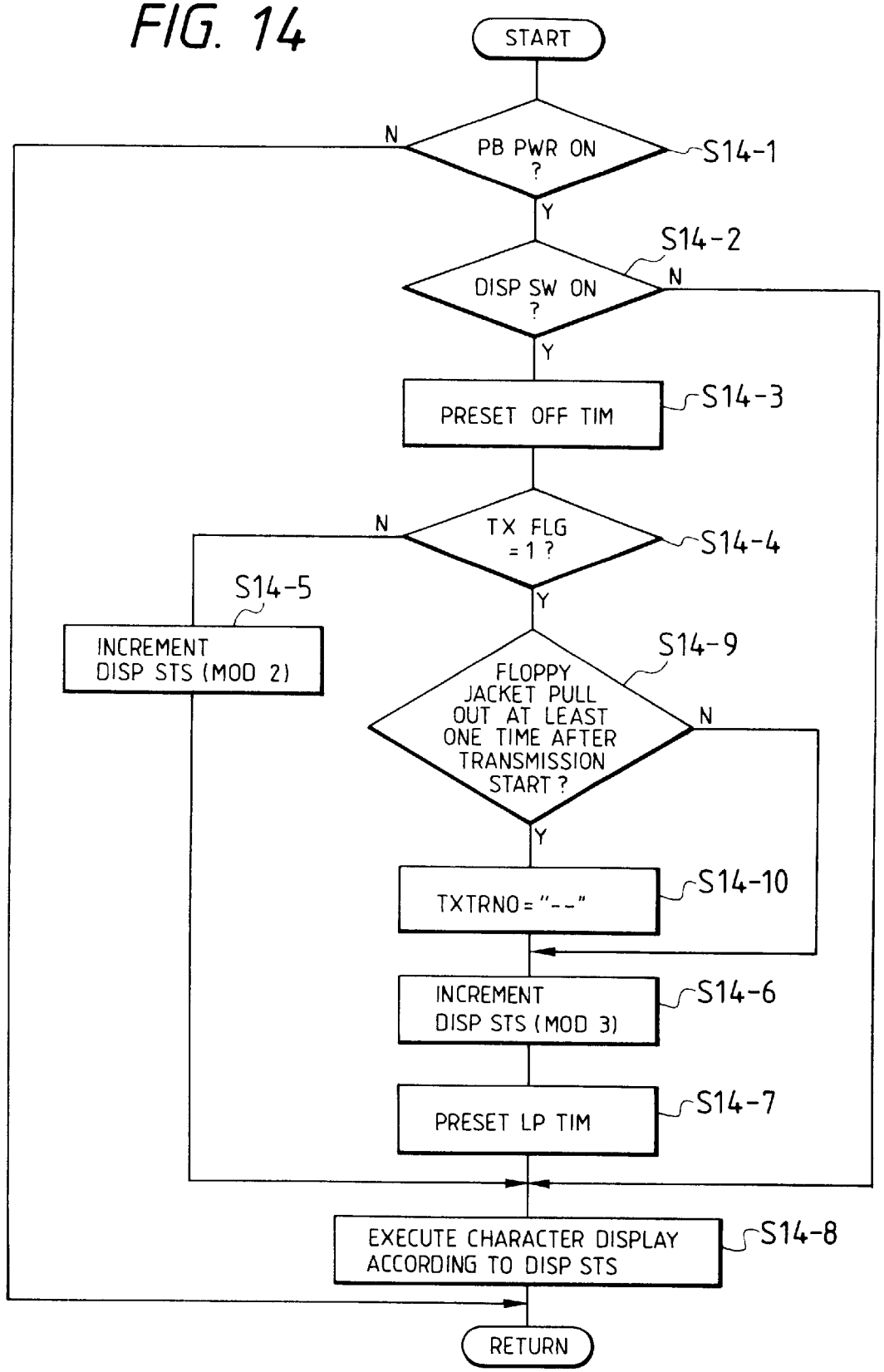

If the power switch 6 is not pressed, a reproduction routine (step 5-4), which will be explained in detail in FIGS. 6A and 6B, is executed, and the reproduction deck control around the video floppy is performed. Further, a transmission routine (step 5-5) to control the transmitting operation, which will be described in detail in FIG. 7, is performed. A character routine (step 5-6) to superimpose the track information onto the monitor, which will be explained in detail in FIG. 14, is executed. A power control routine (step 5-7) to mainly control the power sources of the reproduction processing circuit portion and deck portion is executed. The processing routine is then returned to step 5-2 and the apparatus waits for the next program interruption.

(Reproduction routine)

The reproduction routine in FIG. 5 will now be described with reference to FIGS. 6A and 6B.

First, from an output of the detecting circuit 41, a check is made to see if a video floppy has been loaded or not (step 6-1). If NO, the PB PWR of the reproduction processing portion, DECK PWR around the deck, and MONI PWR of the monitor portion are respectively turned off (step 6-23). The reproduction initialization flag INI FLG is set (step 6-24).

If a floppy jacket has been loaded in step 6-1, a check is made to see if the reproduction initialization flag INI FLG has been set or not. If the flag INI FLG is set to "0", that is, if the reproduction initialization is unnecessary, the processing routine advances to step 6-9 and subsequent steps. If the flag INI FLG is set to "1", that is, if the reproduction initialization is needed, the PB PWR of the reproduction processing portion, DECK PWR of the deck portion, and TONI PWR of the monitor portion are respectively put on (step 6-3). Thereafter, the reproduction initialization is executed (step 6-4). The heads HA and HB are once moved to the innermost rim of the jacket. After the absolute track position was recognized, the heads are moved to the first track. In general, the period of time which is required until the end of this operation is longer than the program interruption period. However, in this embodiment, after a reproduction initialization command was once given to the motor drive circuit 33 and head drive circuit 19, these circuits automatically execute the above-mentioned operations. After completion of the reproduction initializing operation, a variable PBTRNO of the reproduction track number is set to "1" (step 6-5). If the operation regarding the reproducing operation is not performed during the transmitting operation, the operating mode is set to the low electric power consumption mode to put off the power sources to the reproduction processing portion and deck portion and a timer LP TIM which is provided for this purpose is preset (step 6-6). A period of time at this time of the timer LP TIM is set to about ten seconds. It is sufficient to set the value of this timer to, e.g., about ten seconds. Next, the timer OFF TIM to put off the power sources when the operations are not executed for a predetermined period of time as mentioned above is preset (step 6-7). The reproduction initialization request flag INI FLG is set to "0" (step 6-8). The timer OFF TIM is set to a time longer than the LP TIM, for instance, about ten minutes.

In step 6-9, a check is made to see if the low electric power consumptiom mode has been set at present or not. If this mode has been set, the processes in step 6-9 and subsequent steps are not executed but returned in order to ignore the subsequent track up/down routine. If NO, a check is made to see if the track up switch 3 has been pressed or not (step 6-10). If YES, the timer OFF TIM is preset (step 6-12). A check is then made to see if the current reproduction track number is smaller than 50 (the maximum track No.) or not (step 6-13). If the track No. is 50, step 6-22 follows to ignore the subsequent steps. If it is smaller than 50, the track is advanced by one track in such a direction as to increase PBTRNO (inner peripheral direction) (step 6-14). After the PBTRNO was increased, the LP TIM is preset (step 6-16).

If the track up switch 3 is not pressed in step 6-10, a check is made to see if the track down switch 4 has been pressed or not (step 6-11). If the switch 4 is not pressed, the track of the PBTRNO is reproduced (step 6-22). If the switch 4 has been pressed, the OFF TIM is preset (step 6-17). In a manner similar to the track up routine, the processes in steps 6-18 to 6-21 are executed. Only when the PBTRNO is larger than "1" (step 6-18), the track is advanced in such a direction as to decrease the PBTRNO (in the outer peripheral direction) (steps 6-19 to 6-21). When the track feeding operation is performed in this manner, the PBTRNO track is reproduced in step 6-22. When the track up/down operation is performed, the OFF TIM and LP TIME are preset, so that the timing operations are newly started from this time point.

(Transmission routine)

Next, the transmission routine in step 5-5 in FIG. 5 will now be described with reference to FIG. 7.

If the flag TX FLG is set to "0", i.e., if the transmission is not performed, a check is then made to see if the transmission start switch 7 has been pressed or not (step 7-2). If NO, the power source TX PWR of the transmission control circuit 35 and the power source MEM PWR of the memory portion consisting of the circuits 26 and 27 are put off (step 7-16). If the switch 7 has been pressed, the OFF TIM is preset (step 7-3). The presence or absence of the reproduction envelope of the first field is checked by detecting the output level of the envelope detecting circuit 22 (step 7-4). If the envelope does not exist, step 7-16 follows. If the envelope exists, a check is made to see if the reproduction mode is the frame reproduction mode or not by checking whether the reproduction mode switch 16 has been pressed or not (step 7-5). If the field reproduction mode has been set, by confirming that the envelope exists in the first field, the image can be reproduced, so that step 7-7 follows. If the frame reproduction mode has been set, the presence or absence of the reproduction envelope of the second field is checked to see if the other field can be reproduced or not (step 7-6). If no reproduction envelope exists in steps 7-4 and 7-6, this means that the image to be transmitted does not exist. Therefore, step 7-16 follows and the transmission in inhibited. On the contrary, if the image to be transmitted exists, the processing routine advances to step 7-7 and subsequent steps and the transmitting operation is started.

In step 7-7, the parameters necessary to start the transmission are initialized. Practically speaking, variables Z and Y indicative of the transmission lines shown in FIG. 3 and a variable X representative of the dot position in the horizontal direction are cleared. On the other hand, on the basis of the transmission mode switch 15, reproduction mode switch 16, and further, color/monochrome signal obtained from the reproduction processing circuit 23, the transmission mode which is actually executed upon transmission, the last line No. YE of one screen shown in FIG. 4, and the number of repetition times of the transmission sequence shown in FIG. 3, that is, the number N of sheets are determined as shown in Table 1.

TABLE 1

| Transmission mode SW 15 | Reproduction mode SW 16 | Reproduction Color/monochrome | Actual transmission mode | Last line No. YE | Number of sheets N |
| --- | --- | --- | --- | --- | --- |
| Monochrome field | Field/frame | Color/monochrome | Monochrome field | 255 | 1 |
| Monochrome frame | Field | Color/monochrome | Monochrome pseudoframe | 511 | 1 |
|  | Frame | Color/monochrome | Monochrome frame | 511 | 1 |

TABLE 1-continued

| Transmission mode SW 15 | Reproduction mode SW 16 | Reproduction Color/ monochrome | Actual transmission mode | Last line No. YE | Number of sheets N |
|---|---|---|---|---|---|
| 2 colors | Field/frame | Color | 2 colors | 255 | 2 |
|  |  | Monochrome | Monochrome field | 255 | 1 |
| 3 colors | Field/frame | Color | 3 colors | 255 | 3 |
|  |  | Monochrome | Monochrome field | 255 | 1 |

If the transmission mode switch 15 has been set to the color mode in spite of the fact that the reproduction signal is the monochrome signal, the same information is transmitted a plurality of times. Therefore, in this embodiment, the actual transmission mode is set to the monochrome field mode, thereby avoiding the vain operation. Thus, the optimum transmission mode can be selected in accordance with the characteristic of the image.

On the other hand, in step 7-7, the value of the reproduction track number PBTRNO is substituted to the variable TXPBNO as the transmission track number.

After the transmission parameters were initialized, the power source AD PWR of the A/D converters 24 and 25 and the power source MEM PWR of the memory portion are respectively put on (step 7-8). Thereafter, the memory freezing operation is executed in accordance with Table 2. The memory circuit shown in FIG. 2 has two field memories $M_0$ and $M_1$ as shown in the following Table.

TABLE 2

| Actual transmission mode | Memory storage state | |
|---|---|---|
|  | $M_0$ | $M_1$ |
| Monochrome field | $Y_{1st}$ | None |
| Monochrome pseudoframe | $Y_{1st}$ | None |
| Monochrome frame | $Y_{1st}$ | $Y_{2nd}$ |
| 2 colors/3 colors | $Y_{1st}$ | $(R-Y)_{1st}/(B-Y)_{1st}$ |

$Y_{1st}$ denotes a Y signal of the first field, $Y_{2nd}$ indicates a Y signal of the second field, and $(R-Y)_{1st}/(B-Y)_{1st}$ is a line sequential color difference signal of the first field.

Figure 20A:
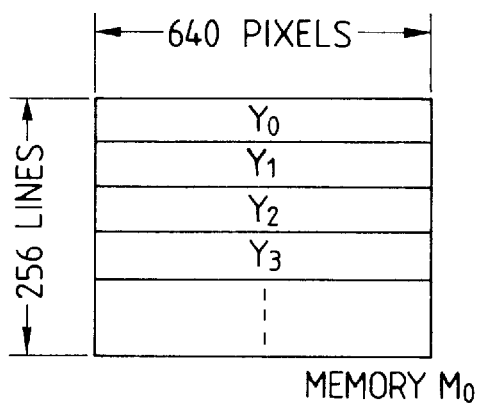
FIGS. 20A to 21B are diagrams for explaining the storage of an image signal into a memory.
Figure 20B:
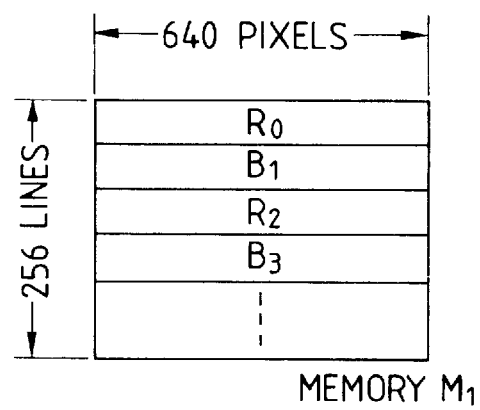
Figure 21A:
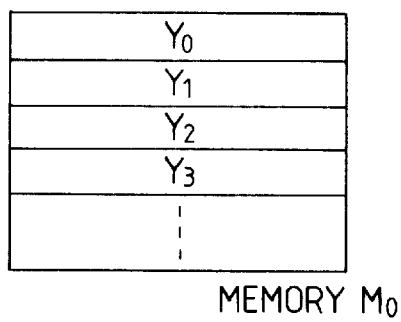
Figure 21B:
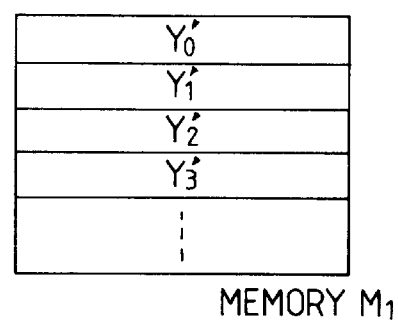

FIGS. 20A and 20B schematically show the storage state in the color field mode (2 colors/3 colors). FIGS. 21A and 21B schematically show the storage state in the monochrome frame mode. The suffix of Y represents the line number. On the other hand, in the monochrome field mode and monochrome pseudoframe mode, only the memory $M_0$ in FIG. 21A is stored.

As mentioned above, after the reproduction signal was stored in the memory, the power source AD PWR of the A/D converters 24 and 25 and the power source DECK PWR of the deck portion are put off (step 7-10). Next, the dropout is compensated on the basis of the dropout pulse DOP which is supplied from the reproduction processing circuit 23 to the memory control circuit 27 (step 7-11). As a practical compensating method, for instance, a pre-interpolation may be used in the embodiment. As another method, it is possible to use a method as disclosed in, e.g., Japanese Patent Application No. 62-19463 which has already been proposed by the applicant of the present invention.

After completion of the compensation of the dropout, the power source TX PWR of the transmission control circuit 35 is put on (step 7-12). The flag TX FLG indicating that the transmission is being performed is set to "1" (step 7-13).

Further, since the transmission mode has been set in this case, the LP TIM is preset (step 7-14). An interruption request mask IRQMSK is set to "0" (step 7-15) to start the transmission interruption routine shown in FIGS. 8A and 8B.

If the flag TX FLG is set to "1" in step 7-1, that is, if the transmission is being executed, a check is made to see if the transmission stop switch 8 has been pressed or not (step 7-17). If NO, step 7-22 follows. The OFF TIM is preset to turn off the power source after the elapse of a predetermined period of time so as to not to turn off the power source immediately after completion of the transmission.

Consequently, the power source is not put off just after the completion of the transmitting operation. Therefore, it will be convenient for the user because he can soon execute the next operation.

If the transmission stop switch 8 has been pressed in step 7-17, the IRQMSK is set (step 7-18) so as not to start the transmission interruption routine. The flag TX FLG is set to "0" (step 7-19). Further, to put off the power sources of the transmission circuit portion and memory circuit portion, the TX PWR and MEM PWR are put off (step 7-20). Thus, the unnecessary electric power consumption can be suppressed as small as possible. Next, the LEDs 10 to 12 to indicate the advancement of the transmission sequence are all lit off (step 7-21). The OFF TIM is preset (step 7-22) in a manner similar to the case where the transmission stop switch 8 is not pressed.

Figure 8A:
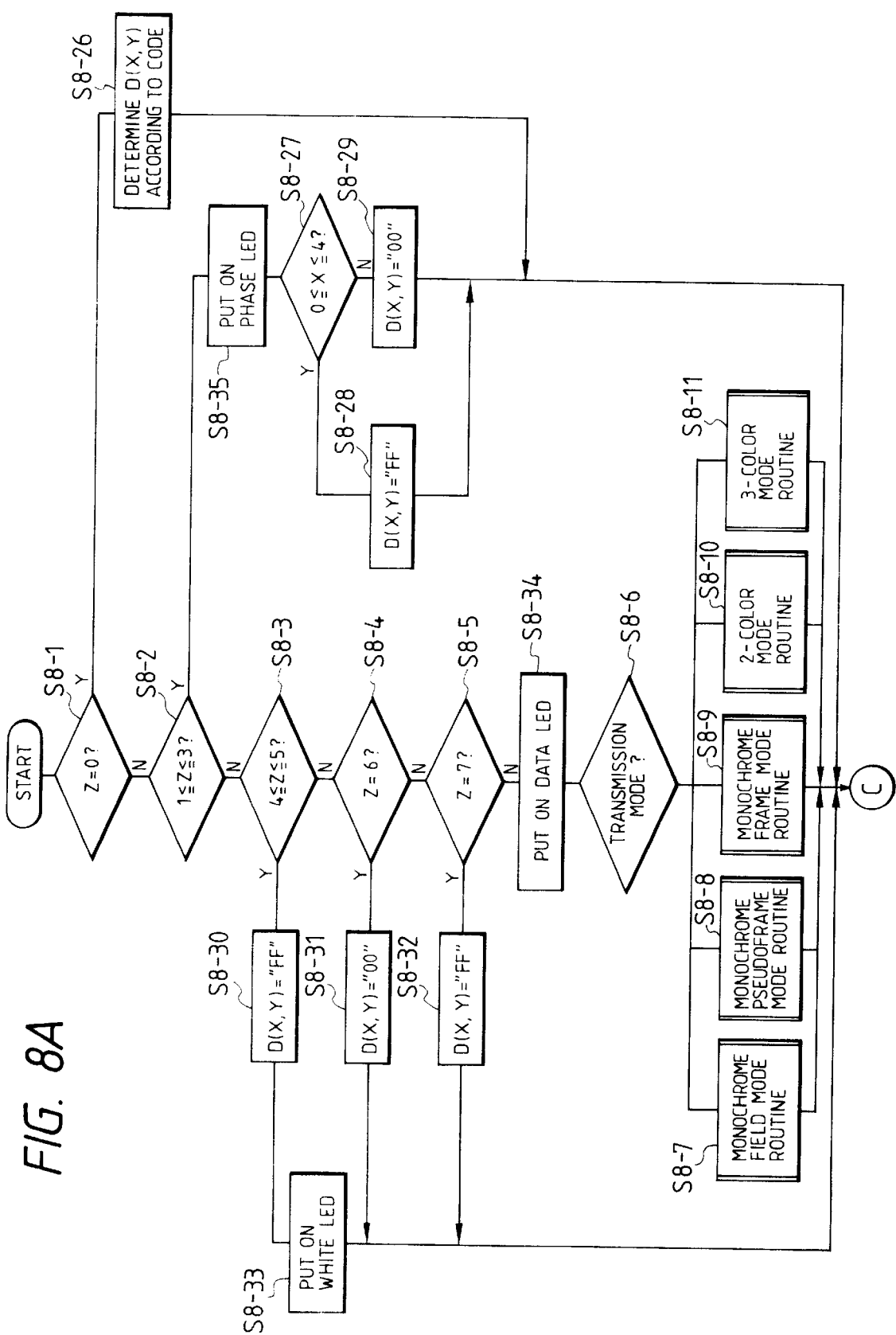
Figure 8B:
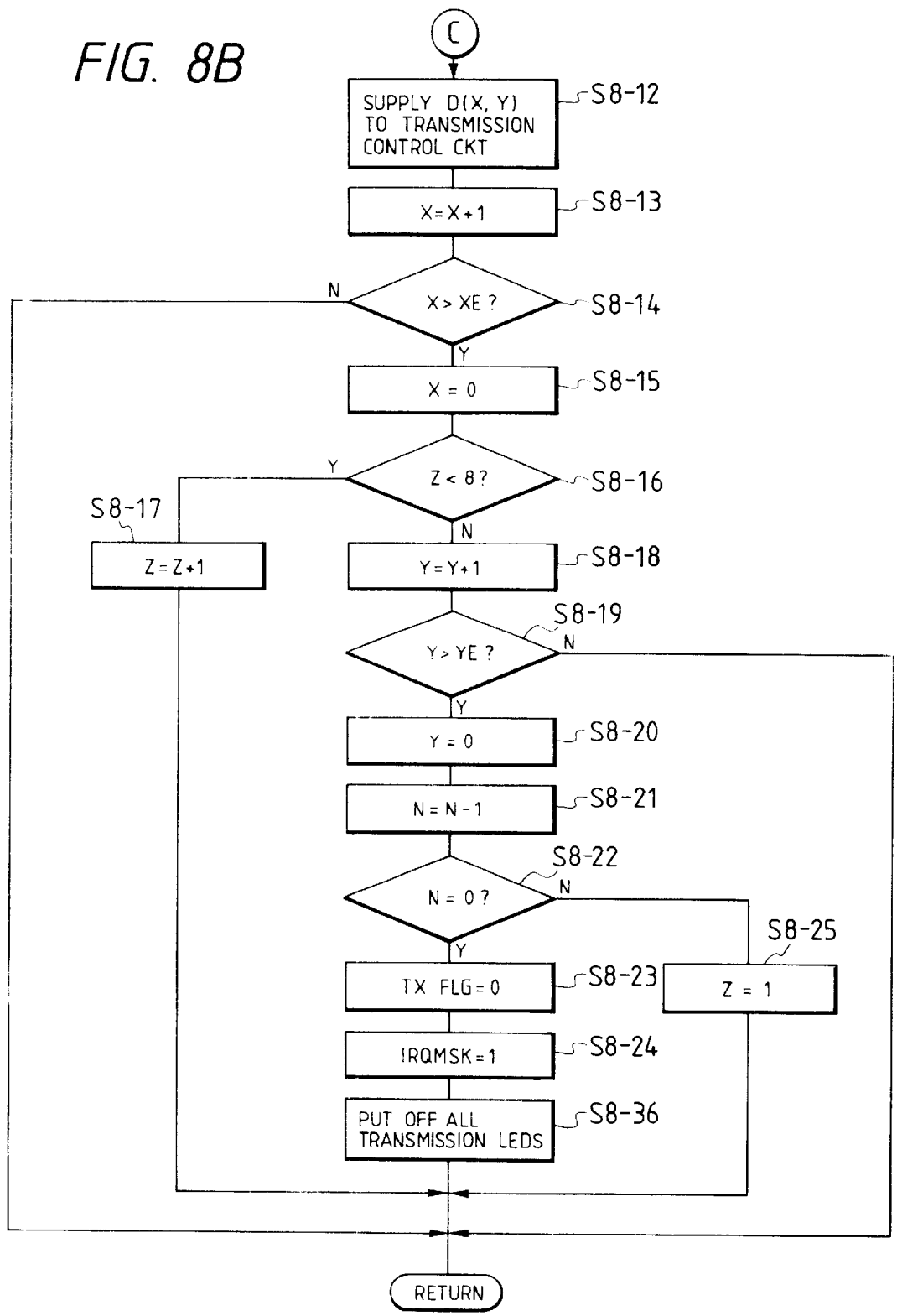

The transmitting process by the interrupting process will now be described with reference to FIGS. 8A and 8B. FIGS. 8A and 8B is a diagram for explaining the transmission interruption routine. After the transmission was started, when Z=0 (step 8-1) as described in FIG. 3, the transmission data D(X, Y) is determined (step 8-26) in correspondence to the code including the parameters such as the transmission mode and the like which are necessary for reception. As practical data, the data of three bits corresponding to eight kinds of transmitting procedures shown in Table 1 can be used.

Next, if Z is set to a value within a range from 1 to 3 (YES in step 8-2), this means the sync portion. Therefore, the phase LED 10 is lit (step 8-35) and the address X in the horizontal direction is then checked (step 8-27). If $0 \leq x \leq 4$, the transmission data is set to "FF", i.e., the highest white level (step 8-28). If 4<X, the transmission data is set to "00", that is, the black level (step 8-29). If Z=4 or 5 (step 8-3), this means the reference white level portion. Therefore, the transmission data D(X,Y) is set to "FF" (step 8-30). At the same time, the phase LED 10 is not lit and the white LED 11 is lit (step 8-33). When Z=6 (step 8-4), this means the first 1H in the data start detection portion. Therefore, the transmission data is set to "00", i.e., the black level (step 8-31). When Z=7 (step 8-5), this means the next 1H, so that the transmission data is set to "FF", i.e., the white level (step 8-32). When Z=8, namely, in the case of the image portion, the white LED 11 is not lit and, thereafter, the data LED 12 is lit (step 8-34). The processing routine advances to each of the routines (steps 8-7 to 8-11) in accordance with the actual transmission mode determined in Table 1 (step 8-6).

Figure 9:
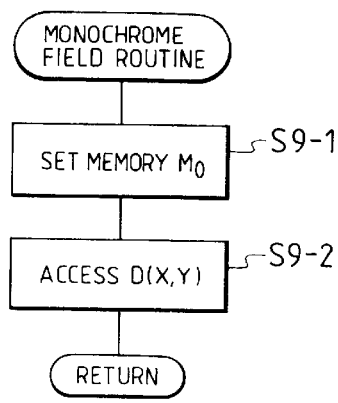

FIG. 9 shows the monochrome field mode routine in step 8-7. In this mode, as shown in Table 2, since the image data is stored into only the memory $M_0$, the operating mode is set to the mode to read out the image data from the memory $M_0$ (step 9-1). Thereafter, the data D(X,Y) in the address (X,Y) is accessed (step 9-2).

Figure 10:
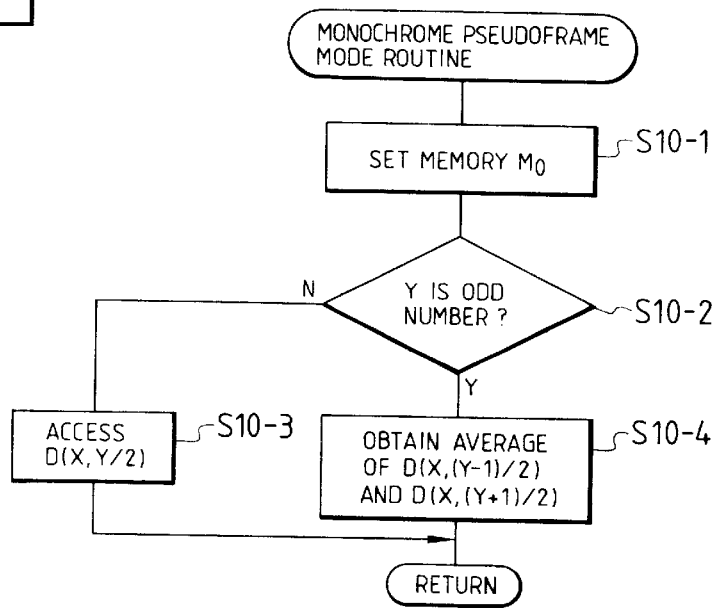

FIG. 10 shows the monochrome pseudoframe mode routine in step 8-8. In a manner similar to the monochrome field mode, as shown in Table 2, in this mode, the image data is stored into only the memory $M_0$. Therefore, after the memory MN was set (step 10-1), a check is made to see if the vertical line number is an odd number or an even number (step 10-2). If it is the even number line, the memory data D(X, Y/2) is directly read out (step 10-3). If it is the odd number line, the average value of the memory data D(X, (Y−1)/2) and D(X,(Y+1)/2), i.e., the average value of the upper and lower lines is calculated (step 10-4) to perform the linear interpolation.

Figure 11:
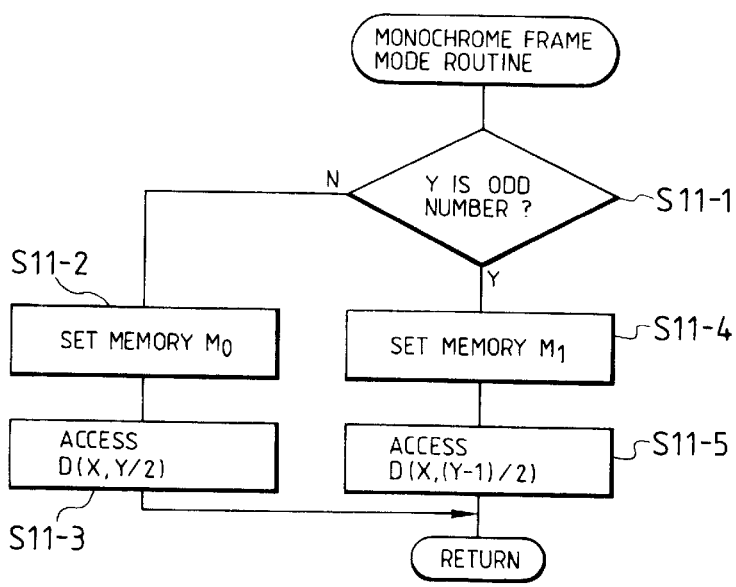

FIG. 11 shows the monochrome frame mode routine in step 8-9. In this mode, since the image data of each field is stored in the memories $M_0$ and $M_1$ as shown in Table 2, respectively, a check is made to see if the vertical line number is the even number or the odd number (step 11-1). If it is the even number line, the memory $M_0$ is set to, read out the data on the first field side (step 11-2). The data D(X,Y/2) in the address (X, Y/2) is accessed (step 11-3). If it is the odd number line in step 11-1, the memory $M_1$ is set to read out the data on the second field side (step 11-4). The data D(X,(Y−1)/2) in the address (X, (Y−1)/2) is accessed (step 11-5).

Figure 12:
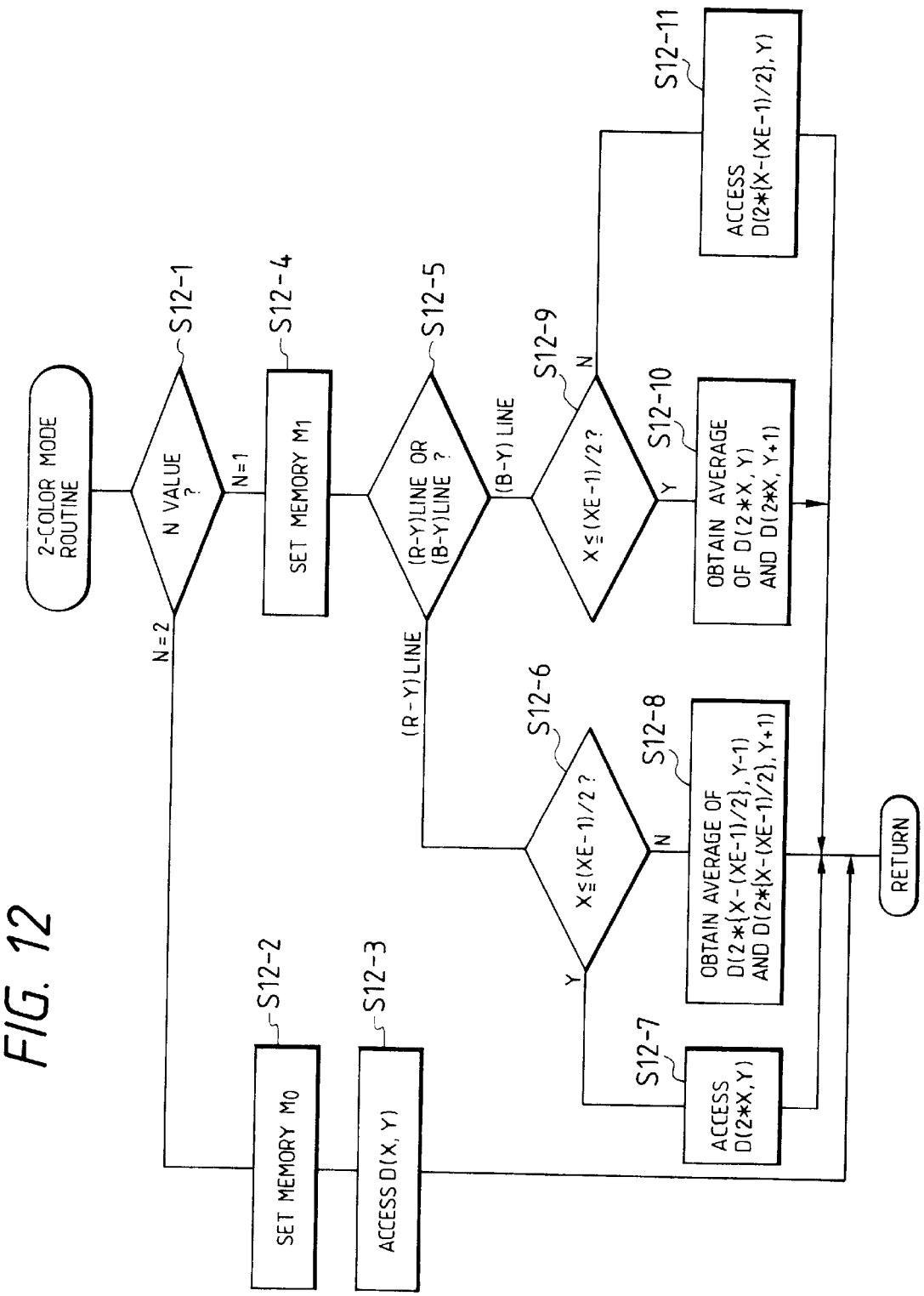
Figure 17A:
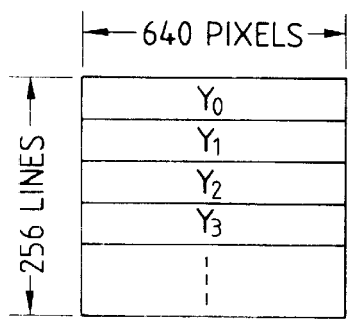
FIGS. 17A to 19B are diagrams for explaining the transmitting order of the embodiment.
Figure 17B:
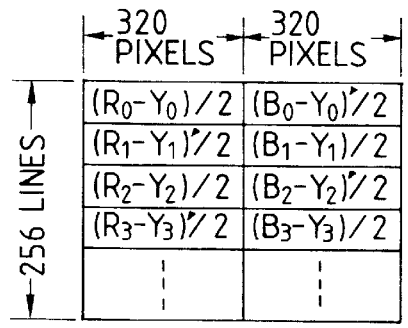

FIG. 12 shows the 2-color mode routine in step 8-10, shown in FIGS. 8A and 8B. FIGS. 17A and 17B schematically show a format of data which is actually transmitted in the 2-color mode. FIG. 17A relates to the first color and shows the Y signal in which the number of pixels in the horizontal direction is 640 and the number of lines in the vertical direction is 256. FIG. 17B relates to the second color and the (R-Y) and (B-Y) signals which are derived by thinning out every other pixel in the horizontal direction and each of which corresponds to 320 pixels in the horizontal direction are made simultaneous in one line and transmitted. Each fraction shown in FIG. 17B denotes that the signals were thinned out every other pixel and (') indicates that a line which does not exist is interpolated by the average value or the like of the upper and lower lines.

In FIG. 12, when the variable N indicative of the color number is set to "2" in step 12-1, that is, in the case of the first color, the signal is the Y signal. Therefore, the memory $M_0$ is set (step 12-2). The data D(X,Y) in the address (X,Y) is accessed (step 12-3).

On the other hand, if the value of N is set to "1" in step 12-1, namely, in the case of the second color, the memory $M_1$ is set (step 12-4). Thereafter, a check is made to see if the present line is the (R-Y) line or (B-Y) line (step 12-5). If it is the (R-Y) line, a check is made to see if the transmission address X in the horizontal direction is (XE−1)/2 or less, that is, whether it is within the former half 320 pixels or not (step 12-6). If YES, the address (2*X,Y) in the memory to be actually accessed is obtained and this data D(2*X,Y) is accessed (step 12-7). In the embodiment, "*" denotes the multiplication. If NO in step 12-6, i.e., if the address X is within the latter half 320 pixels, in order to perform the average value interpolation of the upper and lower lines to obtain the (B-Y) data which does not exist, the color difference signals in the actual memory addresses (2*{X−(XE−1)/2 }, Y−1) and (2*{X−(XE−1)/2}, Y+1) are accessed and the average value of these signals is calculated (step 12-8).

If the present line is the (B-Y) line in step 12-5, in order to obtain the (R-Y) data which does not exist in the case where the address X is (XE−1)/2 or less, namely, within the former half 320 pixels in step 12-9, the average value of the memory data in the actual addresses (2*X, Y) and (2*X, Y+1) is calculated (step 12-10). If NO in step 12-9, the data in the memory address (2*{X−(XE−1)/2}, Y) is accessed (step 12-11).

Figure 13:
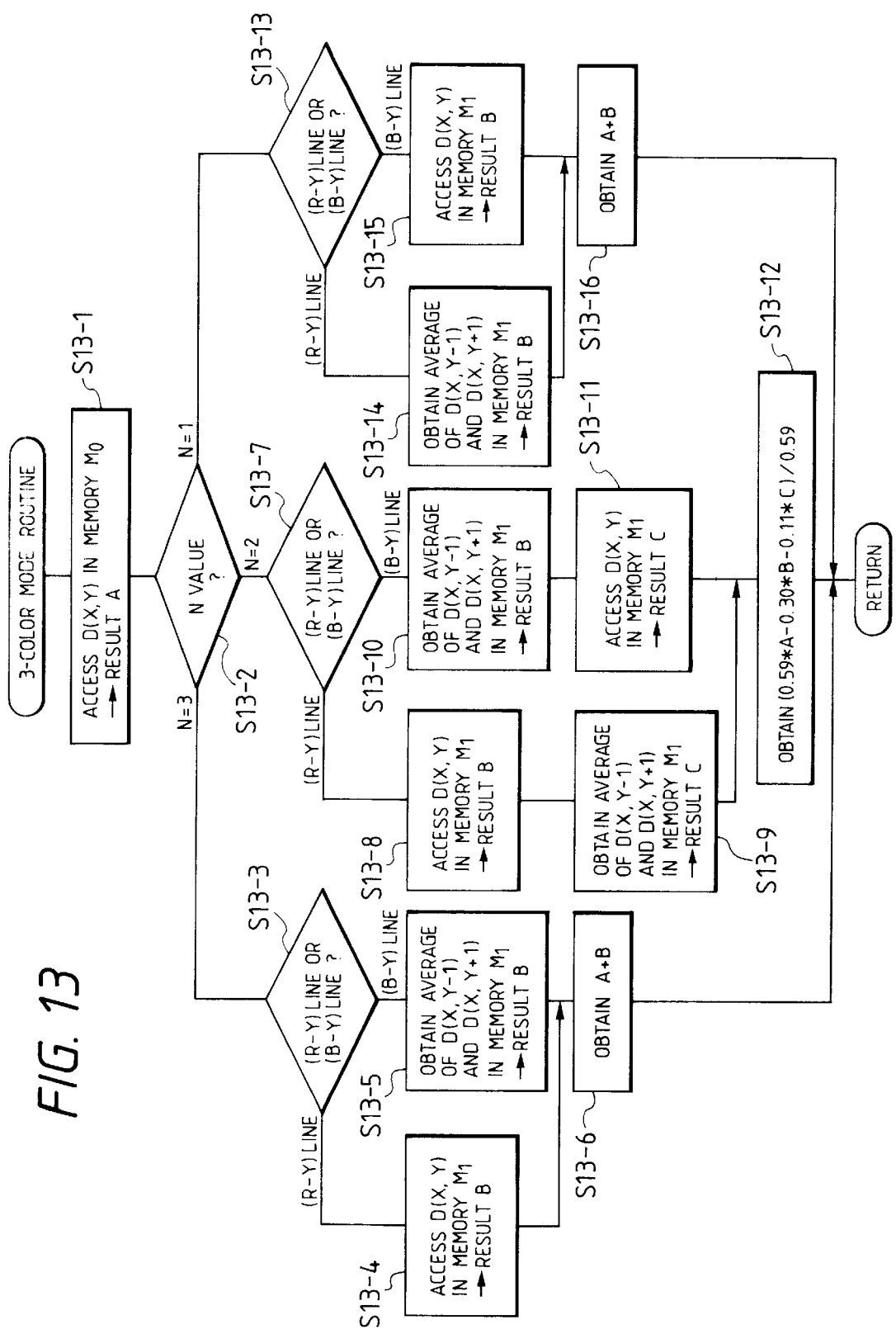

FIG. 13 shows the details of the routine in the 3-color mode. First, the data D(X,Y) in the memory $M_0$ is accessed to obtain the Y signal data of the present line and the resultant data is stored into a variable A (step 13-1).

Figure 18A:
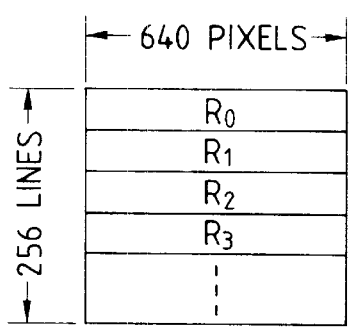
Figure 18B:
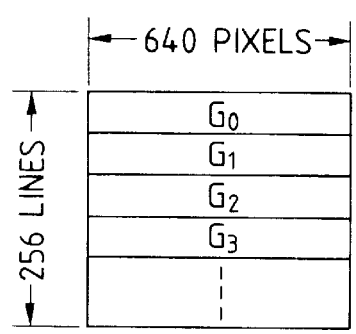
Figure 18C:
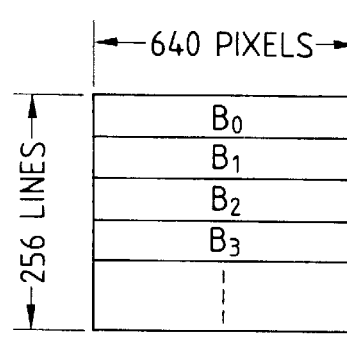

Next, as shown in FIG. 18, the signals are area sequentially transmitted on the basis of the order of R, G, and B in accordance with the value of N as shown in FIG. 18 (Step 13-2).

When N=3, i.e., in the case of the R signal, a check is made to see if the present line is the (R-Y) line or (B-Y) line at the color difference signal level in the memory (step 13-3). If it is the (R-Y) line, the data D(X,Y) is directly read out of the memory $M_1$ (step 13-4). If it is the (B-Y) line, both of the data D(X, Y−1) and D(X, Y+1) in the memory $M_1$ are read out to interpolate from the upper and lower lines and the average value of them is calculated (step 13-5). The resultant data in steps 13-4 and 13-5 are stored into a variable B. The variables A and B are added to obtain an R signal in the next step 13-6.

When N=2 in step 13-2, that is, in the case of the G signal, a check is similarly made to see if the present line is the (R-Y) line or the (B-Y) line (step 13-7). In the case of the (R-Y) line, the data in the address (X,Y) in the memory $M_1$ is read out and stored as the (R-Y) data into the variable B (step 13-8). The (B-Y) data is obtained by calculating the average value of the data D(X, Y−1) and D(X, Y+1) of the upper and lower lines in the memory $M_1$ and stored into a variable C (step 13-9). If the present line is the (B-Y) line in step 13-7, the average value of the data D(X, Y−1) and D(X, Y+1) of the upper and lower lines in the memory $M_1$ is calculated and stored as the (R-Y) line data into the variable B (step 13-10). On the other hand, the readout data of D(X,Y) from the memory $M_1$ is used as the (B-Y) data (step 13-11). From the data A, B, and C, that is, the Y, (R-Y), and (B-Y) data obtained in this manner.

$$Y = 0.59G + 0.30R + 0.11B$$

$$\therefore G = (Y - 0.30R - 0.11B)/0.59$$

$$= \{0.59*Y - 0.30*(R - Y) - 0.11*(B - Y)\}/0.59$$

$$= (0.59*A - 0.30*B - 0.11*C)/0.59$$

are calculated (step 13-12).

If N=1 in step 13-2, i.e., in the case of the B signal, it can be obtained in substantially the same manner as in the case of obtaining the R signal in steps 13-3 to 13-6 (steps 13-13 to 13-16).

The transmission data D(X,Y) obtained in steps 8-1 to 8-11 in FIG. 8 as explained above is supplied from the system control circuit 39 to the transmission control circuit 35 (step 8-12). The horizontal address X of the transmission is increased by "1" (step 8-13). If the address X is the final dot address XE or less (step 8-14), the processing routine is finished. If the address X exceeds the address XE, the X is set to "0" (step 8-15). A check is then made to see if the Z, i.e., the count value of the vertical counter other than the image portion is 8 or smaller or not, in other words, whether the portion to be processed is the image portion or not (step 8-16). If NO, the Z is increased by "1" (step 8-17). If YES, the count value Y of the vertical counter is increased by "1" (step 8-18). A check is made to see if the increased count value exceeds the final vertical line number YE or not (step 8-19). If NO, the processing routine is finished. If YES, this means that the processes of the image data of one screen have been finished. Therefore, the vertical line number Y is set to "0" (step 8-20). The variable N indicative of the number of sheets is decreased by "1" (step 8-21). If the value of N is not "0" (step 8-22), Z=1 is substituted to start the transmission of the next screen from the beginning, and the processing routine is finished (step 8-25). This is because in the case of tht second and subsequent screens, the processes are started from the sync signal portion shown in FIG. 3. If N=0 in step 8-22, this means that the transmission of all of the data has been completed, so that the flag TX FLG indicating that the transmission is being executed is set to "0" (step 8-23). The IRQMSK is set to "1" to stop the transmission interruption (step 8-24).

(Character routine)

The character routine shown in step 5-6 in FIG. 5 will now be described with reference to FIG. 14.

In this routine, a check is made to see if the power source of the reproduction processing portion has been put on or off, that is, whether the video floppy has been set into the reproducing mode or not (step 14-1). If it is put off, no character is displayed. In this embodiment, characters are displayed together with the reproduction image on the monitor 1 as mentioned above. However, the invention is not limited to this. Only characters can be displayed without displaying the reproduction image. In this case, if the PB PWR is put off, only the number of track which is being transmitted is displayed. If PB PWR has been put on in step 14-1, a check is made to see if the DISP switch 5 has been pressed or not (step 14-2). If NO, step 14-8 follows. If YES, the OFF TIM is preset (step 14-3). Thereafter, a check is made to see if the transmission is being executed or not (step 14-4). If NO, namely, in the case of the mere reproducing mode, a character display state variable DISP STS is increased by modulo 2 (step 14-5). If the transmission is being executed, a check is made to see if the jacket has once been taken out or not after the transmission was started (step 14-9). If the jacket is not taken out, step 14-6 follows. If YES, the transmission track number TXTRNO stored is set to a meaningless symbol "--" (step 14-10). This is because since the TXTRNO is the track number in the jacket loaded at the start of the transmission, when the jacket has once been taken out, it is not guaranteed that the jacket inserted next is the same as the jacket before it is taken out.

Therefore, by executing the processes in steps 14-9 and 14-10, the displayed track number TXTRNO, that is, the number of track of the jacket which was loaded in the apparatus and on which track the image to be transmitted is recorded can be accurately known. The DISP STS is increased by modulo 3 (step 14-6) and the LPTIM is preset (step 14-7). Characters are displayed in accordance with the DISP STS (step 14-8).

Figure 15A:
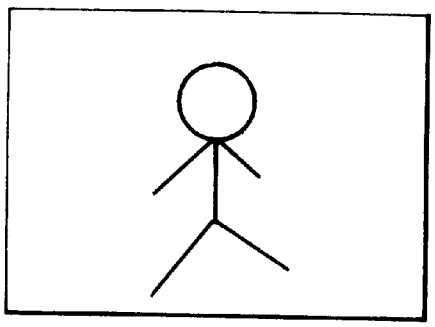
FIGS. 15A to 15C are schematic depictions of characters displayed during operation of the embodiment of FIG. 1.
Figure 15B:
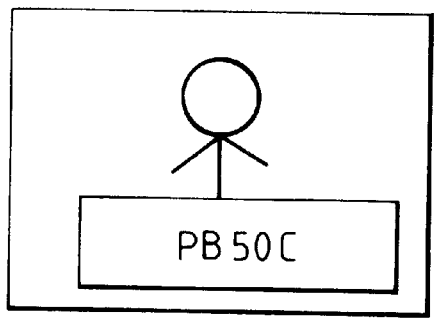
Figure 15C:
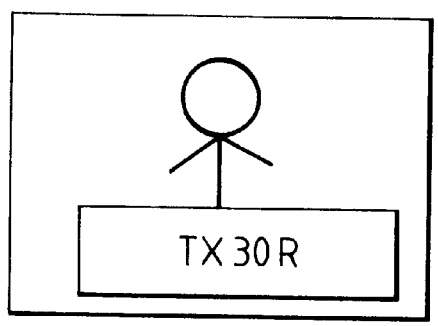

FIGS. 15A to 15C schematically show characters which are displayed on the monitor 1 shown in FIG. 1. FIG. 15A shows a state when DISP STS=0 and relates to the mode in which no character is displayed. In this mode, only an image is reproduced as a visible image on the monitor 1. FIG. 15B shows a state when DISP STS=1 and relates to an example in the case of displaying the reproduction track number. FIG. 15C shows a state when DISP STS=2 and relates to an example in the case of displaying the transmission track number. Practically speaking, the content which is displayed in step 14-8 is determined as shown in Table 3.

TABLE 3

| DISP STS | Each mode | | | Display format |
|---|---|---|---|---|
| 0 | — | | | Not display |
| 1 | Color reproduction mode | | | PBXXC |
|  | Monochrome reproduction mode | | | PBXXM |
| 2 | 3 COLOR | N | 3 | TXΔΔR |
|  |  |  | 2 | TXΔΔG |
|  |  |  | 1 | TXΔΔB |
|  | 2 COLOR | N | 2 | TXΔΔY |
|  |  |  | 1 | TXΔΔ($^R_B$) |
|  | MONOCHROME | N | 1 | TXΔΔM |

XX denotes the PBTRNO and is inserted as two-digit numerals. ΔΔ indicates the TXTRNO and is displayed as two-digit numerals. TX ΔΔR/B) means that R and B are alternately displayed at a predetermined period (for instance, 0.5 Hz) since two colors exist in one screen. In this embodiment, the above-mentioned content has been displayed as an example. However, the invention is not limited to this content but various modified contents can be also displayed.

(Power control routine)

The power control routine in step 5-7 in FIG. 5 will now be described with reference to FIG. 16.

First, a check is made to see if the transmission is being performed or not by checking the value of the TX FLG flag (step 16-1). If NO, the processing routine advances to step 16-11 and subsequent steps. If YES, a check is made to see if a video floppy has been loaded or not (step 16-2). If NO, step 16-11 and subsequent steps follow. If a video floppy has been loaded in step 16-2, this means that the reproduction and transmission are simultaneously being executed. Therefore, the value of the LP TIM is first checked to stop the display of the monitor 1 (step 16-3). If it is not "0", the power sources of the reproduction processing portion, deck portion, and the like must be put on. Therefore, the value of the LP TIM is decreased by "1" (step 16-8) and, thereafter, step 16-10 follows. On the contrary, if the value of LP TIM is "0" in step 16-3, this means that the low electric power consumption mode has been set. Accordingly, checks are sequentially made to see if the switches regarding the control of the reproduction system to return from this mode, that is, the track up switch 3, track down switch 4, and display switch 5 have been pressed or not (steps 16-4 to 16-6). If none of those switches is pressed, the power sources PB PWR, DECK PWR, and MONI PWR of the reproduction processing portion, deck portion, and monitor portion are respectively put off (step 16-7). On the other hand, if it is detected in steps 16-4 to 16-6 that either one of the switches has been pressed, the LP TIM is preset (step 16-9). Thereafter, the power sources PB PWR, DECK PWR, and MONI PWR are respectively put on (step 16-10).

After completion of the routine regarding the foregoing low electric power consumption mode, the processing routine advances to step 16-11 as a routine to put off the power source of the apparatus after the elapse of a predetermined period of time from the final operation. In this step, if the value of the OFF TIME has been set to "0", the system control circuit 39 controls the power supply circuit 30 and puts off all of the power sources to the respective circuit portions and, thereafter, also puts off the SYS PWR (step 16-13). If the OFF TIME is not "0" in step 16-11, the value of the OFF TIME is decreased by "1" to start the timing operation of the OFF TIME (step 16-12).

By executing the foregoing processes of the flow, the electric power consumption of the portions which are unnecessary for the operation is cut off and the low electric power consumption can be realized.

On the other hand, according to the embodiment, since the power sources of the reproduction portion and monitor portion are generally automatically put on by turning on the track up/down switches in the low electric power consumption mode, this apparatus can be easily used. Moreover, since the power sources of the reproduction portion and monitor portion are automatically put on by merely operating the switch to display shown in FIG. 15, there is an advantage such that the apparatus can be easily used.

Figure 19A:
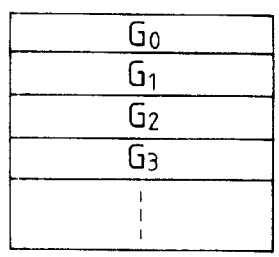
Figure 19B:
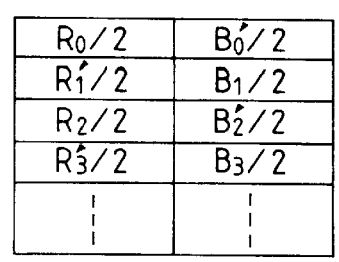

Although the embodiment has been described with respect to the Y signal and the time sharing line simultaneous color difference signals as shown in FIGS. 17A and 17B in the 2-color mode, the invention is not limited to this example. As shown in FIGS. 19A and 19B, the invention can be also applied to the G signal and time sharing line simultaneous R/B signals.

On the other hand, in this embodiment, for the transmission signal, the sync signal portion and reference white level portion of predetermined periods of time are preceding and the transmission side operates one-sidedly. However, the invention can be also applied to a system in which when the reception side detects the sync signal portion, it returns an answer signal, the transmission side detects this answer signal, and the next reference white portion follows. In this case, it is also possible to perform the control in the low electric power consumption mode after entering the image portion.

As described above, according to the embodiment, the low electric power consumption can be realized by putting off the power source of the reproduction system which is generally not so frequently used when both of the reproducing and transmitting operations are simultaneously executed. When the apparatus is used by, particularly, a battery drive, the period of time when the apparatus can operate by the single charging operation can be remarkably prolonged, so that there is an advantage such that the number of transmittable sheets can be increased.

On the other hand, since the power sources are automatically put off in a predetermined period of time, there is an advantage such that there is no need to additionally provide switches to set the operating mode to the low electric power consumption mode and the operating efficiency can be extremely improved.

In the embodiment described above, a monitor apparatus having the transmitting function to transmit still images has been disclosed. However, the invention is not limited to this apparatus and can be also applied to an apparatus which does not have the transmitting function.

On the other hand, in this embodiment, the switch 3 or 4 or display switch 5 has been used as setting means for allowing the operation of the monitor to be started when the reproducing operation of the monitor is stopped and for switching the information to be supplied to the monitor when the reproducing operation is being executed. However, the invention is not limited to this but vairous modifications are possible.

Figure 16:
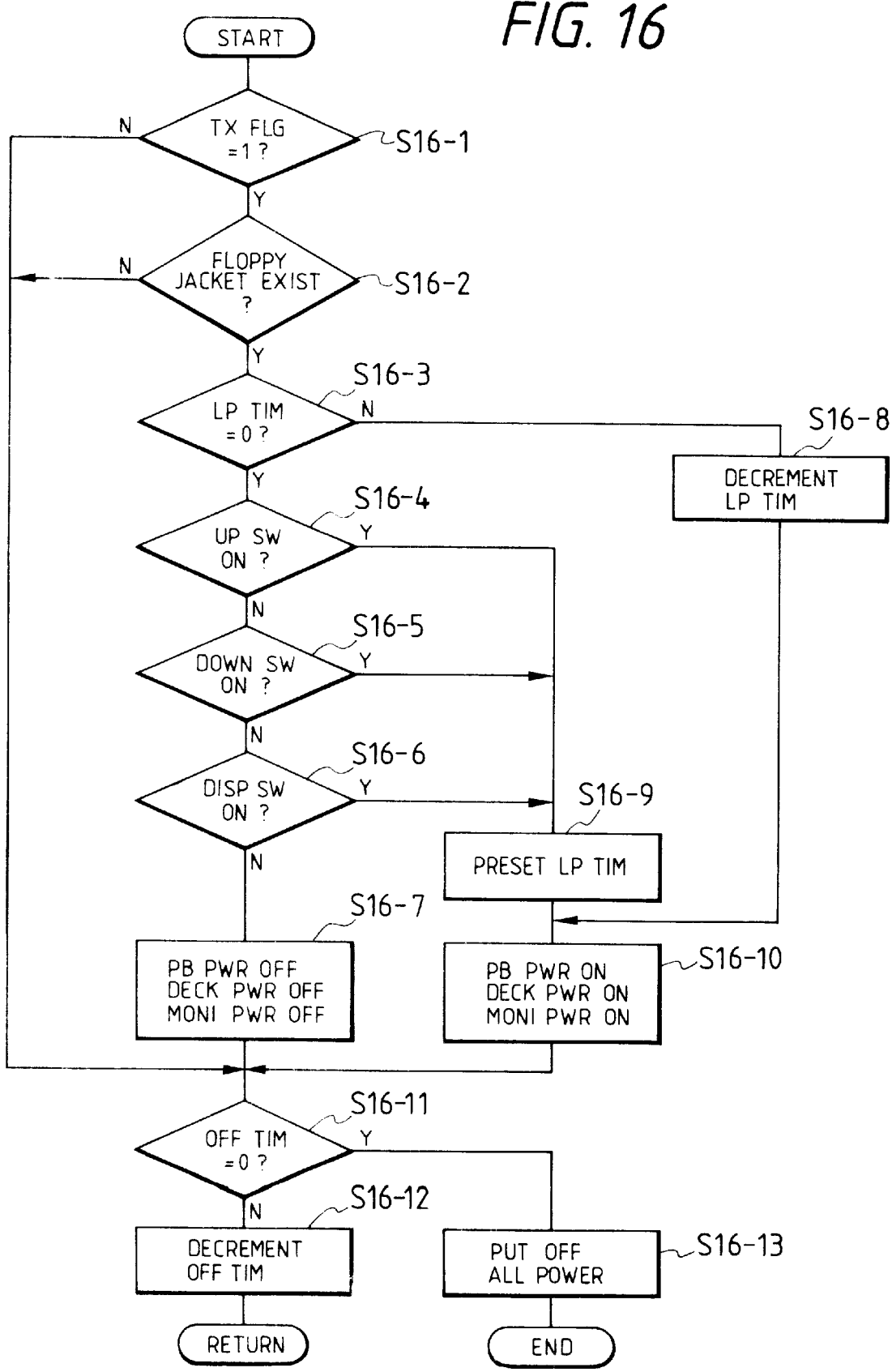

In addition, in this embodiment, the controller to execute the processes in steps 16-7 and 16-13 shown in FIG. 16 to put off the power source MONI PWR of the monitor by the timing operations of the LP TIM and OFF TIM has been used as stopping means for stopping the operation of the monitor. However, the invention is not limited to the construction such that the display is automatically turned off by using the timer. The invention can be also applied to other means in which, for instance, the display is turned off by detecting that the video floppy is unrecorded or the display is turned off by a switch to turn off the display.

In the foregoing embodiment, the controller to execute the processes in steps 7-4 to 7-6 shown in FIG. 7 has been used as means for discriminating the lack of at least one of the fields when the frame reproduction mode has been set. On the other hand, the controller to execute the process in step 7-16 has been used as means for inhibiting the communicating operation when it is decided by the discrimination that either one of the fields lacks.

The embodiment is not limited to the construction by the software as mentioned above but can be also applied to the construction by a hardware.

According to the embodiment, particularly, in the frame reproduction mode, if one of the frames corresponds to the unrecorded track, the transmission has been inhibited. Therefore, the transmission is not erroneously performed and there is an advantage such that the operating efficiency can be remarkably improved.

As described above, according to the embodiment, there has been provided the switch having the function to sequentially switch and display the number of track which is at present being reproduced and the number of track which is at present being transmitted together with the image signal on the monitor. Therefore, any special display device to display the track number does not need to be provided on the front panel. There is an advantage such that the space can be saved.

Further, particularly, in the case of the small apparatus, the reproducing monitor is also inevitably miniaturized, so that if both of the reproducing track and transmitting track are simultaneously displayed on the monitor, characters become small and a problem occurs in the practical use. However, according to the invention, since each track number is sequentially displayed at the same position on the monitor, there are advantages such that the display space on the monitor can be reduced and characters can be easily seen.

According to the foregoing embodiment, a video floppy including a magnetic sheet has been used as memory means. The memory circuit 26 to take in the signals reproduced from the floppy by the heads HA and HB and reproduction processing circuit 23 and the transmission control circuit 35 have been used as means for transmitting the information read out of the memory means. On the other hand, the line connecting the reproduction processing circuit 23 and monitor circuit 1 shown in FIG. 2 has been used as means for supplying the information read out of the memory means to the monitor. In addition, the system control circuit 39 to execute the character routine (shown in FIG. 14) to display as shown in FIGS. 15B and 15C has been used as control means for displaying the kind of information to be transmitted in the case where the information which is supplied by the supplying means to the monitor and the information which is transmitted by the transmitting means differ.

In this embodiment, as mentioned above, by enabling the display as shown in FIG. 15C to be performed by operating the display switch, the kind of information (the track number in this embodiment) to be transmitted is displayed when the information which is displayed on the monitor and the information which is transmitted differ. However, the invention is not limited to this but can be also applied to an apparatus having discriminating means for discriminating whether the information to be displayed on the monitor and the information to be transmitted are the same or not, wherein when it is determined by the discriminating means that both of the information differ, this fact is displayed.

As another display method, information can be also superimposed and displayed on the monitor or other extra special display means may be also used.

As described above, according to the embodiment, even if the information which is being transmitted and the information which is being reproduced as a visible image on the monitor differ, the user can know which kind of information is transmitted. There is an advantage such that the apparatus can be very easily used.

In the foregoing embodiment, the motor drive circuit 33, heads HA and HB, and reproduction processing circuit 23, and A/D converters 24 and 25 shown in FIG. 2 have been used as means for reading out the signals recorded on a medium.

The memory circuit 26, memory control circuit 27, and transmission control circuit 35 have been used as transmitting means for temporarily storing the signals read out by the reading means and for sequentially transmitting through the transmission path.

The controller to execute the processes in steps 7-1 to 7-20 shown in FIG. 7 has been used as means for controlling the power supply to at least a part of the reading means when the transmitting means performs the transmitting operation. However, the power source of a part of the construction of the foregoing reading means can be also reduced or all of the power sources can be also reduced.

As described above, according to the embodiment, by controlling the unnecessary power supply during the transmission, the vain electric power consumption can be reduced.

What is claimed is:

1. A communication apparatus comprising:

means for transmitting first information read out from memory means in which a plurality of images has been stored, through a communication line to a partner's apparatus;

means for reading out second information from said memory means and for supplying the read-out second information to a monitor that reproduces the read-out second information as an image; and control means for controlling the monitor so that during a transmission by said transmitting means, both identifying information of an image of the first information being transmitted by said transmitting means and the image reproduced based on the read-out second information, which is different from the image of the first information being transmitted by said transmitting means, can be displayed simultaneously on the monitor.

2. An apparatus according to claim 1, wherein the information stored in memory means comprises image signals stored in respective memory blocks in the memory means, and comprises the number of the block in which an image signal to be transmitted by said transmitting means is stored.

3. An apparatus according to claim 1, wherein the display of the information under control of said control means is performed on the monitor.

4. An apparatus according to claim 1, further comprising the monitor on which the read-out second information is reproduced as visible images.

5. An apparatus according to claim 3, wherein said control means includes a character generator to generate and display characters on the monitor.

6. An apparatus according to claim 1, wherein said memory means is detachable.

7. An apparatus according to claim 1, wherein the image includes a color image.

8. An apparatus according to claim 1, wherein the read-out second information includes signals of a plurality of color components.

9. A method of controlling a communication apparatus comprising the steps of:

transmitting first information read out from a memory in which a plurality of images has been stored, through a communication line to a partner's apparatus;

reading out second information from the memory;

supplying the read-out second information to a monitor that reproduces the read-out second information as an image; and controlling the monitor so that during a transmission in said transmitting step, both identifying information of an image of the first information being transmitted in said transmitting step and the image reproduced based on the read-out second information, which is different from the image of the first information being transmitted in said transmitting step, can be displayed simultaneously on the monitor.

10. A method according to claim 9, wherein the information stored in the memory comprises image signals stored in respective memory blocks in the memory, and comprises the number of the block in which an image signal to be transmitted in said transmitting step is stored.

11. A method according to claim 9, wherein the display of the information in said controlling step is performed on the monitor.

12. A method according to claim 9, further comprising the step of generating characters to be displayed on the monitor.

13. A method according to claim 9, wherein the image includes a color image.

14. A method according to claim 9, wherein the read-out second information includes signals of a plurality of color components.

* * * * *

UNITED STATES PATENT AND TRADEMARK OFFICE
CERTIFICATE OF CORRECTION

PATENT NO.   : 5,970,202
DATED        : October 19, 1999
INVENTOR(S)  : Masahiro Takei et al.

It is certified that error appears in the above-identified patent and that said Letters Patent is hereby corrected as shown below:

Column 2:
Line 36, "monitor," should read -- monitor 1 -- and "being is" should read -- being --; and
Line 54, "on" should be deleted.

Column 5:
Line 10, "once started" should read -- starts --.

Column 6:
Line 25, "off" should read -- to the off --;
Line 27, "lit" should read -- turned --;
Line 43, "put" should read -- turned --; and
Line 44, "put" should read -- turned --.

Column 7:
Line 17, "was" should read -- is --;
Line 25, "put" should read -- turn --; and
Line 30, "put" should read -- turn --.

Column 8:
Line 20, "put" should read -- turned --.

Column 9:
Line 27, "put" should read -- turned --;
Line 55, "put" should read -- turned --; and
Line 66, "put" should read -- turned --.

Column 10:
Line 24, "to not" should read -- not --;
Line 26, "put" should read -- turned --;
Line 33, "put" should read -- turn --;
Line 35, "put" should read -- turned --;
Line 38, "lit" should read -- turned --;
Line 44, "is a diagram" should read -- are diagrams --; and
Line 56, "$0 \leq x \leq 4$," should read -- $0 \leq X \leq 4$, --.

UNITED STATES PATENT AND TRADEMARK OFFICE
CERTIFICATE OF CORRECTION

PATENT NO.    : 5,970,202
DATED         : October 19, 1999
INVENTOR(S)   : Masahiro Takei et al.

Page 2 of 3

It is certified that error appears in the above-identified patent and that said Letters Patent is hereby corrected as shown below:

Column 11:
Line 16, "MN" should read -- $M_o$ --; and
Line 29, "to," should read -- to --.

Column 13:
Line 30, "put" should read -- turned --; and
Line 32, "put" should read -- turned --.

Column 14:
Line 24, "TX$\Delta\Delta$R/B)" -- TX$\Delta\Delta(^R_B)$ --;
Line 45, "put" should read -- turned --;
Line 57, "put" should read -- turned --; and
Line 61, "put" should read -- turned --.

Column 15:
Line 2, "puts" should read -- turns --;
Line 12, "put" should read -- turned --;
Line 16, "put" should read -- turned --;
Line 38, "putting" should read -- turning --; and
Line 48, "put" should read -- turned --.

Column 16:
Line 1, "put" should read -- turn --; and
Line 17, "lacks." should read -- is lacking. --.

Column 17:
Line 46, "and" should read -- ¶ discrimination means for discriminating whether the first information and the second information are the same or not; and --; and
Line 55, "tor." should read -- tor according to a discrimination result by said discrimination means. --.

UNITED STATES PATENT AND TRADEMARK OFFICE
CERTIFICATE OF CORRECTION

PATENT NO.   : 5,970,202
DATED        : October 19, 1999
INVENTOR(S)  : Masahiro Takei et al.

It is certified that error appears in the above-identified patent and that said Letters Patent is hereby corrected as shown below:

Column 18:
Line 30, "and" should read -- ¶ discriminating whether the first information and the second information are the same or not; and --;
Line 35, "information, which is different" should read -- information, --;
Line 36, should be deleted;
Line 37, "ted in said transmitting step," should be deleted; and
Line 38, "monitor." should read -- monitor according to a discrimination result obtained in said discrimination step. --

Signed and Sealed this

Ninth Day of October, 2001

*Attest:*

NICHOLAS P. GODICI
*Attesting Officer*   Acting Director of the United States Patent and Trademark Office